United States Patent
Salas de la Cruz et al.

(10) Patent No.: US 12,018,099 B2
(45) Date of Patent: Jun. 25, 2024

(54) METHODS OF MODIFYING CELLULOSE CRYSTALLINITY

(71) Applicants: Rutgers, The State University of New Jersey, New Brunswick, NJ (US); Rowan University, Glassboro, NJ (US)

(72) Inventors: David Salas de la Cruz, Camden, NJ (US); Xiao Hu, Glassboro, NJ (US); Stacy Love, Camden, NJ (US); David Verrill, Camden, NJ (US)

(73) Assignees: Rutgers, The State University of New Jersey, New Brunswick, NJ (US); Rowan University, Glassboro, NJ (US)

( * ) Notice: Subject to any disclaimer, the term of this patent is extended or adjusted under 35 U.S.C. 154(b) by 469 days.

(21) Appl. No.: 17/218,372

(22) Filed: Mar. 31, 2021

(65) Prior Publication Data
US 2021/0301035 A1    Sep. 30, 2021

Related U.S. Application Data

(60) Provisional application No. 63/002,634, filed on Mar. 31, 2020.

(51) Int. Cl.
| | | |
|---|---|---|
| *C08B 15/08* | (2006.01) | |
| *B01D 67/00* | (2006.01) | |
| *B01D 71/10* | (2006.01) | |
| *C02F 1/44* | (2023.01) | |
| *C08K 3/04* | (2006.01) | |
| *C08K 11/00* | (2006.01) | |
| *C08L 5/08* | (2006.01) | |
| *C08L 67/04* | (2006.01) | |

(52) U.S. Cl.
CPC .......... *C08B 15/08* (2013.01); *B01D 67/0011* (2013.01); *B01D 71/10* (2013.01); *C02F 1/447* (2013.01); *C08K 3/041* (2017.05); *C08K 3/042* (2017.05); *C08K 11/00* (2013.01); *C08L 5/08* (2013.01); *C08L 67/04* (2013.01)

(58) Field of Classification Search
CPC ..... C08B 15/08; B01D 67/0011; B01D 71/10; C08L 89/00; C08L 67/04; C02F 1/447; C08K 3/041; C08K 3/042; C08K 11/00
See application file for complete search history.

(56) References Cited

PUBLICATIONS

Stanton et al., International Journal of Biological Macromolecules, 2018, 108 p. 333-341. (Year: 2018).*
Abushammala et al., Carbohydrate Polymers, 2015, 134, p. 609-616. (Year: 2015).*
Colburn et al., Journal of Membrane Science, 2018, 556, p. 293-302. (Year: 2018).*
Love et al., Cellulose, 2023, 30, p. 6149-6162. (Year: 2023).*
"Keratin as a Protein Biopolymer Extraction from Waste Biomass and Applications", Springer Series on Polymer and Composite Materials, S. Sharma and A Kumar, Editors, 2019.
Blessing, et al., "Morphology and ionic conductivity relationship in silk/cellulose biocomposites", Polym Int, 68(9), 2019, pp. 1580-1590.
Idris, et al., "Dissolution and regeneration of wool keratin in ionic liquids", Green Chemistry, 16(5), 2014, pp. 2857-2864.
Li, et al., "Preparation of Regenerated Wool Keratin Films from Wool Keratin-Ionic Liquid Solutions", J Appl Polym Sci, 127(4), 2013, pp. 2648-2653.
Li, et al., "Towards a molecular understanding of cellulose dissolution in ionic liquids: anion/cation effect, synergistic mechanism and physicochemical aspects", Chem Sci, 9(17), 2018, pp. 4027-4043.
Love, et al., "Facile Treatment To Fine-Tune Cellulose Crystals In Cellulose-Silk Biocomposites Through Hydrogen Peroxide", International Journal of Biological Macromolecules, 147, 2020, pp. 569-575.
Pinkert, et al., "Ionic Liquids and Their Interaction with Cellulose", Chem Rev, 109(12), 2009, pp. 6712-6728.
Stanton, et al., "Structure-property relationships of blended polysaccharide and protein biomaterials in ionic liquid", Cellulose, 24(4), 2017, pp. 1775-1789.

* cited by examiner

*Primary Examiner* — Jonathan S Lau
(74) *Attorney, Agent, or Firm* — Saul Ewing LLP; Domingos J. Silva; Dennis Ostrovsky

(57) ABSTRACT

The present disclosure provides methods of controlling the size of cellulose crystals by mixing a first composition comprising cellulose and coagulating this mixture with varying concentrations of hydrogen peroxide.

15 Claims, 25 Drawing Sheets

| Sample Resin | Coagulant Bath | A σ (mm⁻²) | A d (mm⁻¹) | B σ (mm⁻²) | B d (mm⁻¹) | C σ (mm⁻²) | C d (mm⁻¹) | D σ (mm⁻²) | D d (mm⁻¹) | E σ (mm⁻²) | E d (mm⁻¹) | F σ (mm⁻²) | F d (mm⁻¹) | G σ (mm⁻²) | G d (mm⁻¹) |
|---|---|---|---|---|---|---|---|---|---|---|---|---|---|---|---|
| Pure Wool Keratin | - | 0.77 | 8.21 | 1.34 | 4.68 | 2.20 | 2.74 | 6.79 | 0.93 | 12.39 | 0.51 | - | - | - | - |
| Pure Cellulose | - | 1.95 | 3.22 | - | - | - | - | 10.55 | 0.6 | - | - | 15.98 | 0.39 | - | - |
| 25% Wool Keratin 75% Cellulose | 1% EtOH | 1.44 | 4.37 | - | - | - | - | 8.64 | 0.73 | - | - | 14.18 | 0.44 | - | - |
| 25% Wool Keratin 75% Cellulose | 25% EtOH | 1.49 | 4.31 | - | - | - | - | 8.52 | 0.74 | - | - | 14.18 | 0.44 | - | - |
| 25% Wool Keratin 75% Cellulose | 1% H₂O₂ | 1.44 | 4.37 | - | - | - | - | 8.64 | 0.73 | - | - | 14.18 | 0.44 | - | - |
| 25% Wool Keratin 75% Cellulose | 25% H₂O₂ | - | - | - | - | - | - | 8.75 | 0.72 | - | - | - | - | 13.98 | 0.45 |
| | | | | | | | | | | | | | | 15.58 | 0.4 |
| 75% Wool Keratin 25% Cellulose | 1% EtOH | 1.31 | 4.81 | - | - | - | - | 5.93 | 1.06 | - | - | 14.18 | 0.44 | - | - |
| 75% Wool Keratin 25% Cellulose | 25% EtOH | - | - | - | - | - | - | 6.35 | 0.99 | - | - | 14.36 | 0.44 | - | - |
| 75% Wool Keratin 25% Cellulose | 1% H₂O₂ | - | - | - | - | - | - | 5.93 | 1.06 | - | - | 14.18 | 0.44 | - | - |
| 75% Wool Keratin 25% Cellulose | 25% H₂O₂ | 1.29 | 4.87 | - | - | - | - | 8.64 | 0.73 | - | - | - | - | 14.36 | 0.44 |
| | | | | | | | | | | | | | | 15.78 | 0.4 |

METHODS OF MODIFYING CELLULOSE CRYSTALLINITY

CROSS-REFERENCE TO RELATED APPLICATION

This application claims priority to U.S. Provisional Patent Application No. 63/002,634 entitled "METHODS OF MODIFYING CELLULOSE CRYSTALLINITY," filed Mar. 31, 2020, the disclosure of which is incorporated herein by reference in its entirety.

STATEMENT REGARDING FEDERALLY SPONSORED RESEARCH

This invention was made with government support under grant numbers 1809354 and 1809541 awarded by the National Science Foundation. The government has certain rights in this invention.

BACKGROUND

Biomaterial research is a rapidly growing interdisciplinary field connecting sciences such as chemistry, physics, engineering, material science, and biology. Biocomposites are an expanding class of materials and have attracted much interest due to their abundance, low cost, biocompatibility, and tunable morphological and physicochemical properties.

Biological macromolecules such as cellulose and silk are ideal candidates for the manufacture of blended biomaterials due to their low cost, natural abundance, biodegradability, and biocompatibility. In protein and polysaccharide biocomposite blends, primary and secondary forces play a significant role in the formation and stability of the protein-polysaccharide crystallites such as beta sheets and carbohydrate crystalline structures. The properties of the matrix will depend on how those forces change as a function of specific polymer ratios, types of solvent, and types of coagulation solution. Having the ability to control precise ratios and understanding the effect of fabrication criteria provides a technological approach to the creation of tunable materials with variable but predictable properties.

Typically, protein and polysaccharide biocomposites are processed by dissolution followed by a regenerative phase (coagulation) with a different chemical agent for both of these stages. Each stage provides a pathway to tune the material physico-chemical and morphological properties. Coagulation is a process that rearranges particles and removes "impurities" adsorbed onto these particles. Coagulation is an important fabrication step because the protein (e.g., silk) can hydrogen bond with the carbohydrate, thus changing the coagulator will change the hydrophobicity and mechanical properties of the blend. In such fabrication methods, solvents are also essential, as they are the driving force behind the dissolution of the silk and cellulose. A poor solvent will significantly affect the miscibility of biocomposites and reduce the mechanical properties and physicochemical properties of the blend.

There is thus a need for better control of the various properties of biocomposite materials. The present disclosure addresses this need.

BRIEF SUMMARY OF THE INVENTION

In one aspect, a method of increasing cellulose crystal size is provided. The method includes providing a mixture of at least one solvent comprising at least one ionic compound and a first composition comprising cellulose. The method further includes coagulating the mixture with a second composition comprising hydrogen peroxide, thereby increasing cellulose crystal size. The method includes converting/recrystallizing cellulose I to form cellulose II. The cellulose can be present in a mixture with other biological or synthetic materials. In some aspects, about 1-30% v/v of hydrogen peroxide is used to increase the crystallinity in a mixture containing cellulose.

A cellulose-containing material produced by the methods described herein is also provided. The cellulose-containing material can be used in a variety of applications, including but not limited to as materials in automobiles, airplanes, construction materials, packaging, and the like. The cellulose-containing material can be used alone or in combination with other non-biocomposite materials such as, for example but not limited to, carbon fiber. The cellulose-containing material produced by the methods described herein are suitable for, in non-limiting examples, the manufacture of cellulose-based insulators, aerogels, electrolyte membranes suitable for use in batteries, antibacterial membranes; biologically compatible membranes suitable for tissue engineering applications, including but not limited to the production of in vitro meats for consumer use; and separation// filtration membranes for heavy metal filtration from water and sewage systems.

BRIEF DESCRIPTION OF THE FIGURES

The drawings illustrate generally, by way of example, but not by way of limitation, various embodiments of the present application.

FIG. 8A FTIR is pure wool keratin and cellulose, (FIG. 8B) 25% wool keratin and 75% cellulose coagulated in 1% and 25% of ethanol and hydrogen peroxide and (FIG. 8C) 75% wool keratin & 25% cellulose films coagulated in the same solvents.

FIGS. 9A-9D show SEM (Scanning Electron Microscopy) images of 25% wool keratin and 75% cellulose regenerated films at 500× magnification, (FIG. 9A) 1% ethanol, (FIG. 9B) 25% ethanol, (FIG. 9C) 1% hydrogen peroxide, and (FIG. 9D) 25% hydrogen peroxide.

FIGS. 9E-9H show SEM images of 75% wool keratin and 25% cellulose regenerated films at 500× magnification, (FIG. 9E) 1% ethanol, (FIG. 9F) 25% ethanol, (FIG. 9G) 1% hydrogen peroxide, and (FIG. 9H) 25% hydrogen peroxide.

Figure 10A:
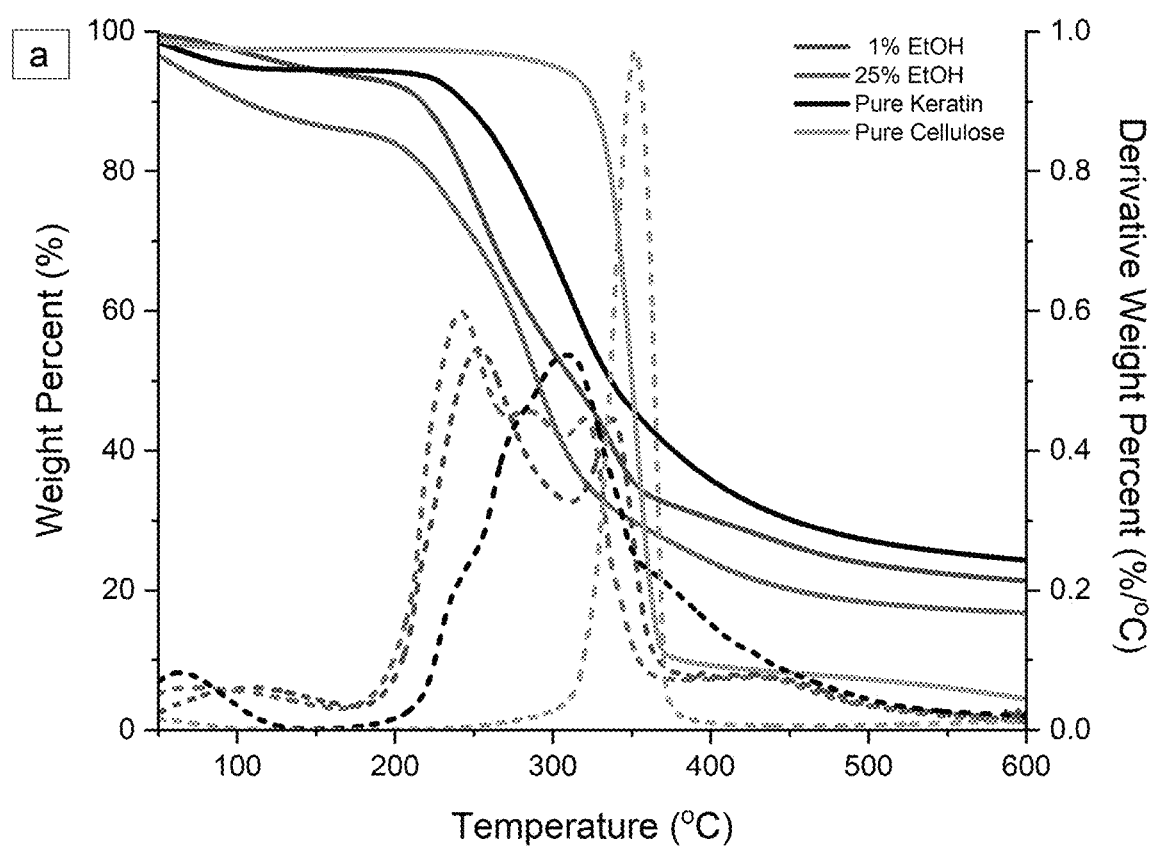
Figure 10B:
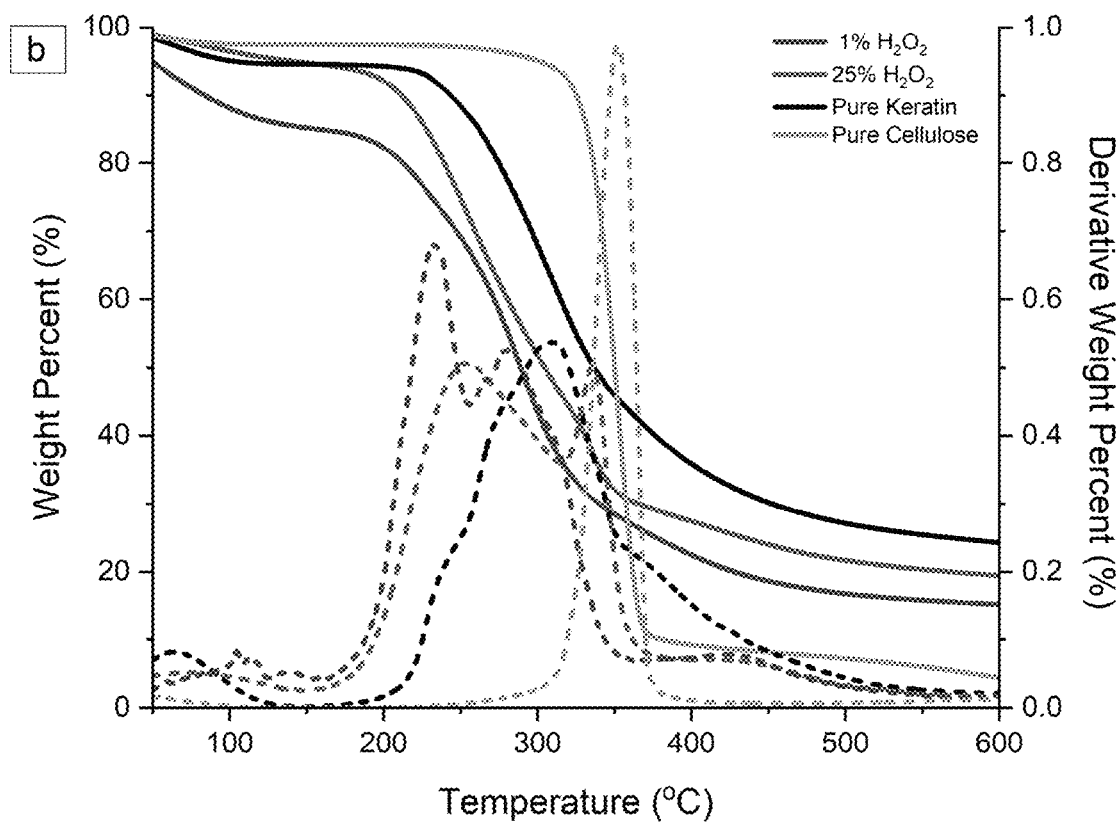

FIGS. 10A-10B show thermograms of 25% wool keratin 75% cellulose in ethanol (FIG. 10A) and hydrogen peroxide (FIG. 10B) coagulation agents with corresponding derivative thermograms.

Figure 11A:
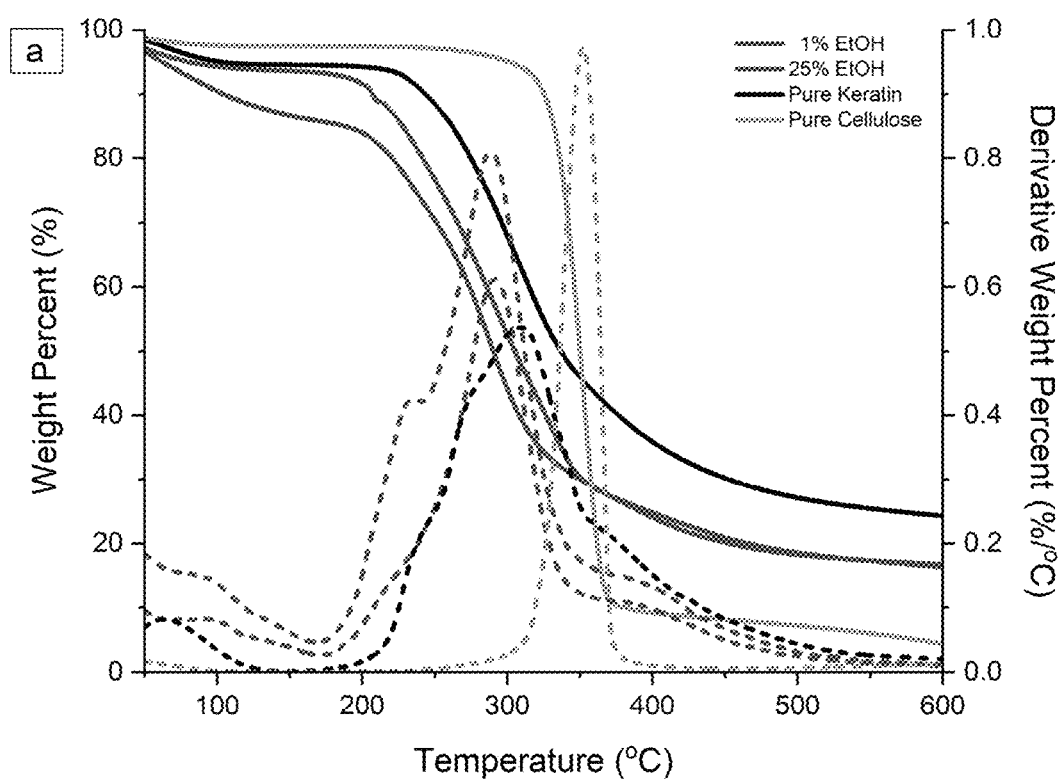
Figure 11B:
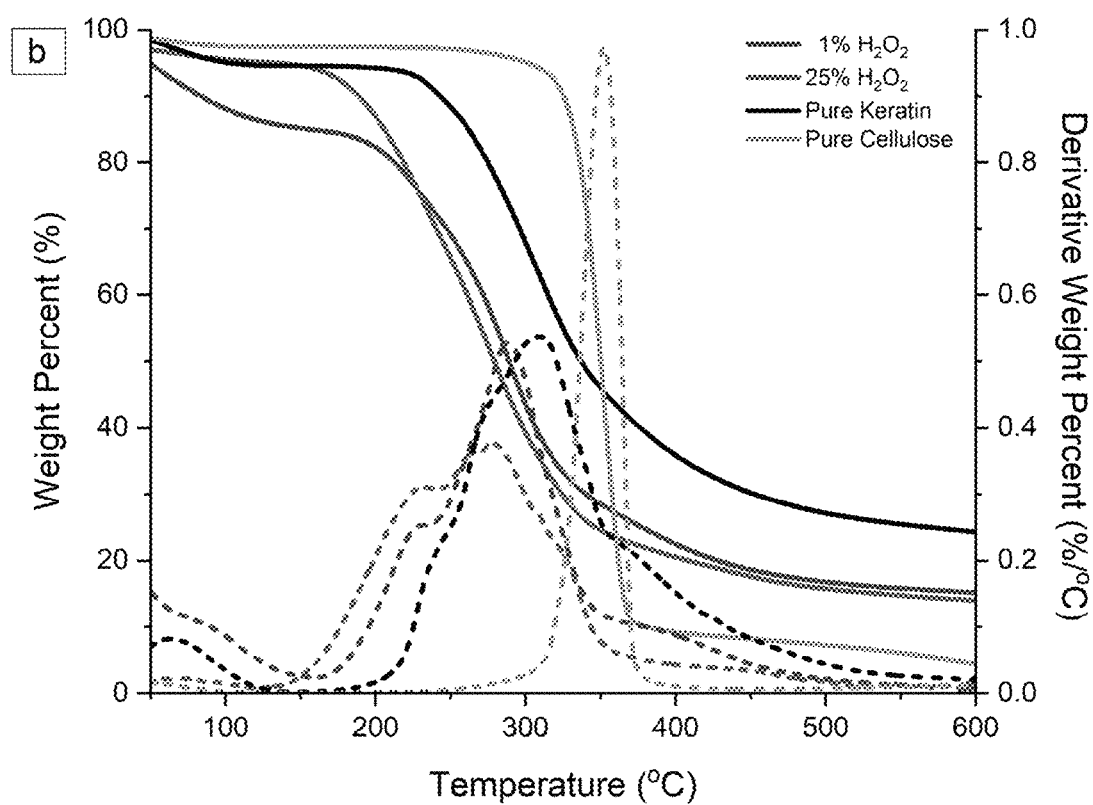

FIGS. 11A-11B thermograms of 75% wool keratin 25% cellulose in various ethanol (FIG. 11A) and hydrogen peroxide (FIG. 11B) coagulation agents and corresponding derivative thermograms.

Figure 12A:
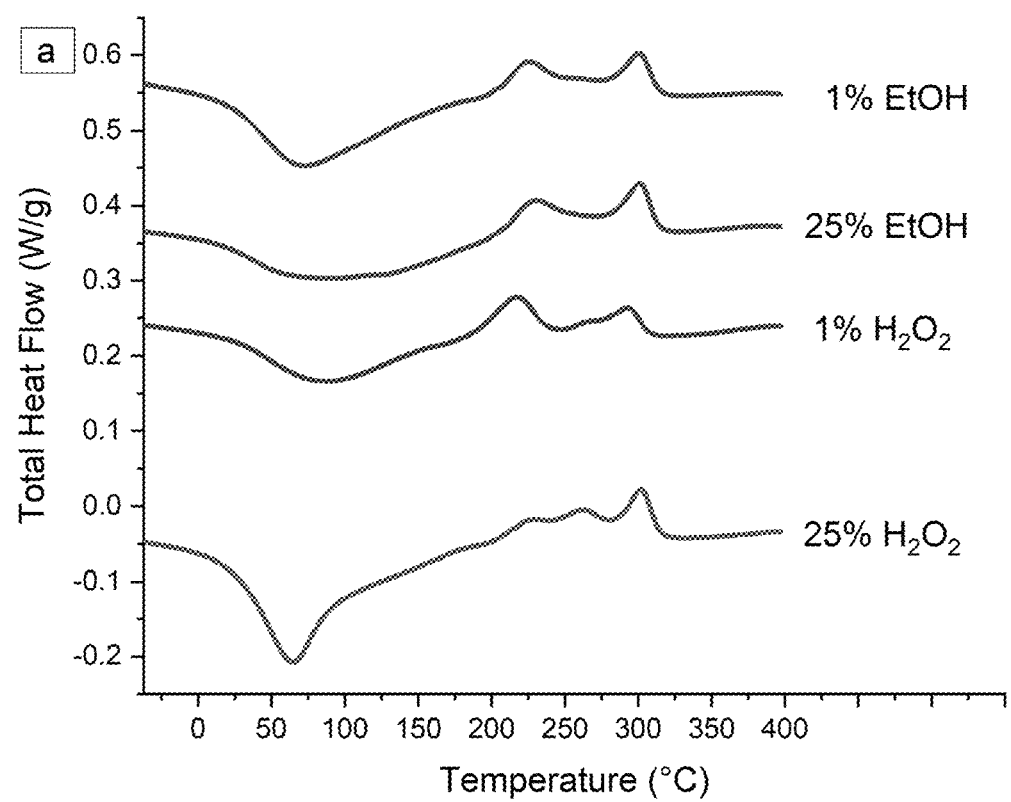
Figure 12B:
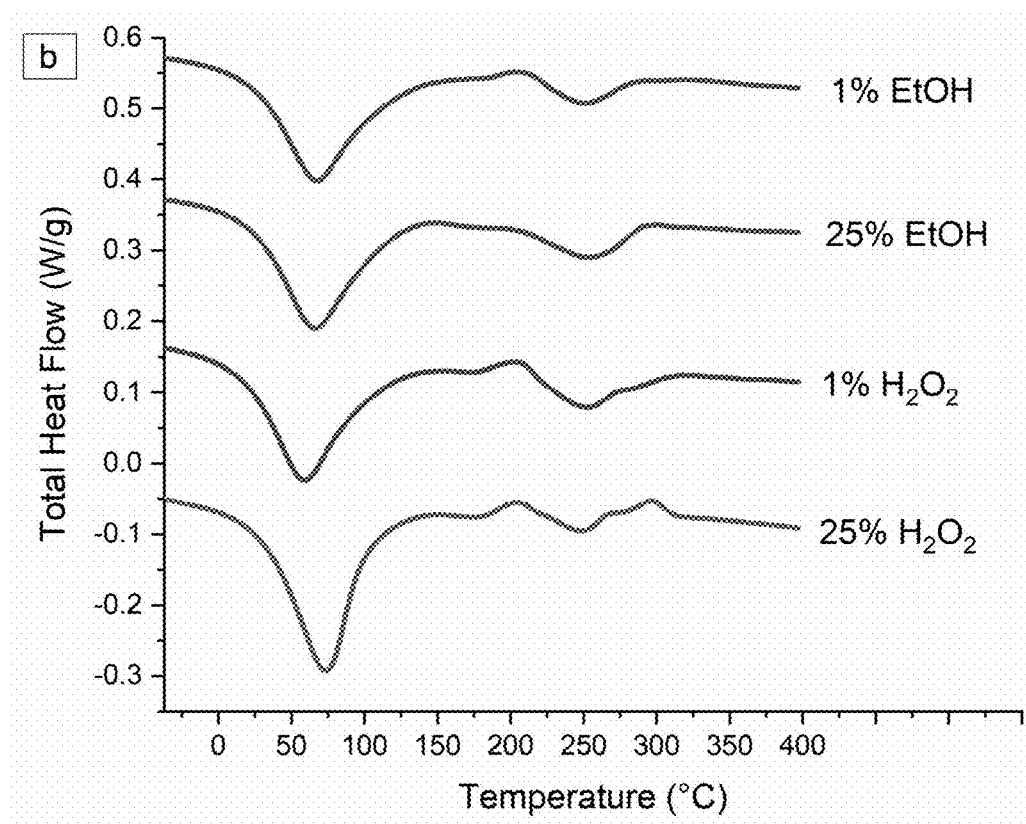

FIGS. 12A-12B show 25% wool keratin and 75% cellulose standard DSC scans (FIG. 12A) and 75% wool keratin and 25% cellulose scans (FIG. 12B). These scans are used to show crystallization and degradation peaks in the samples.

Figure 13A:
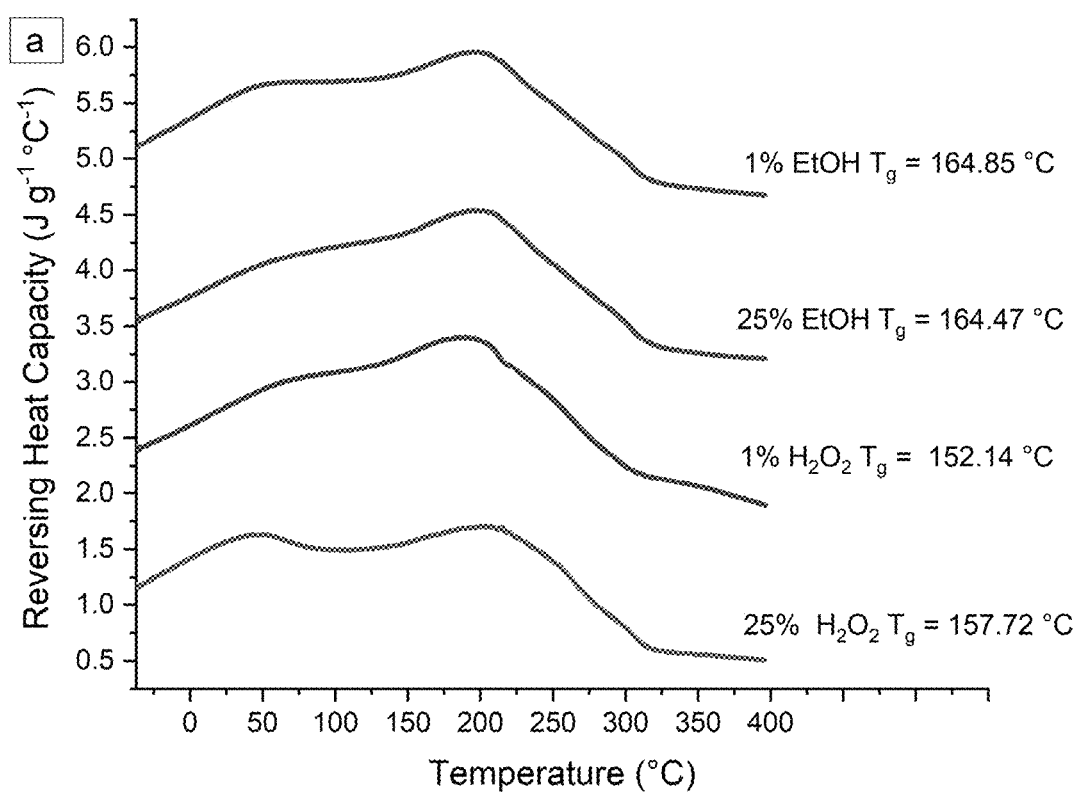
Figure 13B:
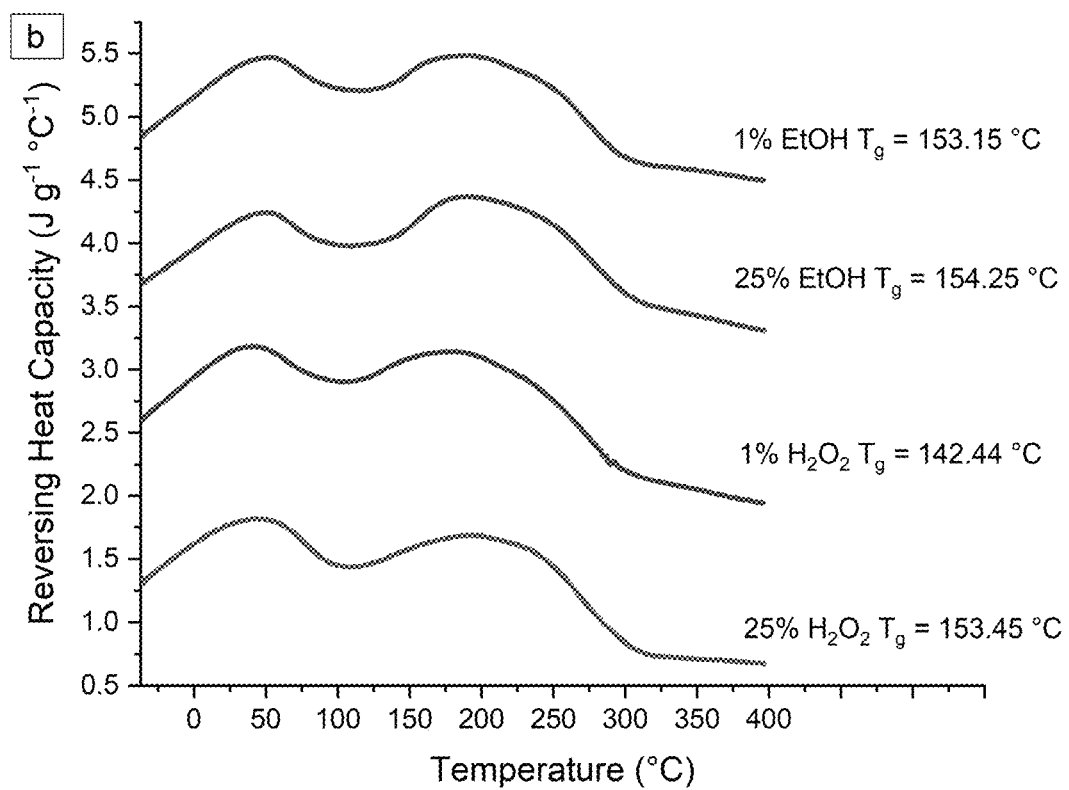

FIGS. 13A-13B show 25% wool keratin and 75% cellulose reversing heat capacities (FIG. 13A) and 75% wool keratin and 25% cellulose reversing heat capacities (FIG. 13B). These scans are used to obtain the glass transition temperature (T g) of all eight samples, listed next to their respective graph.

Figure 14A:
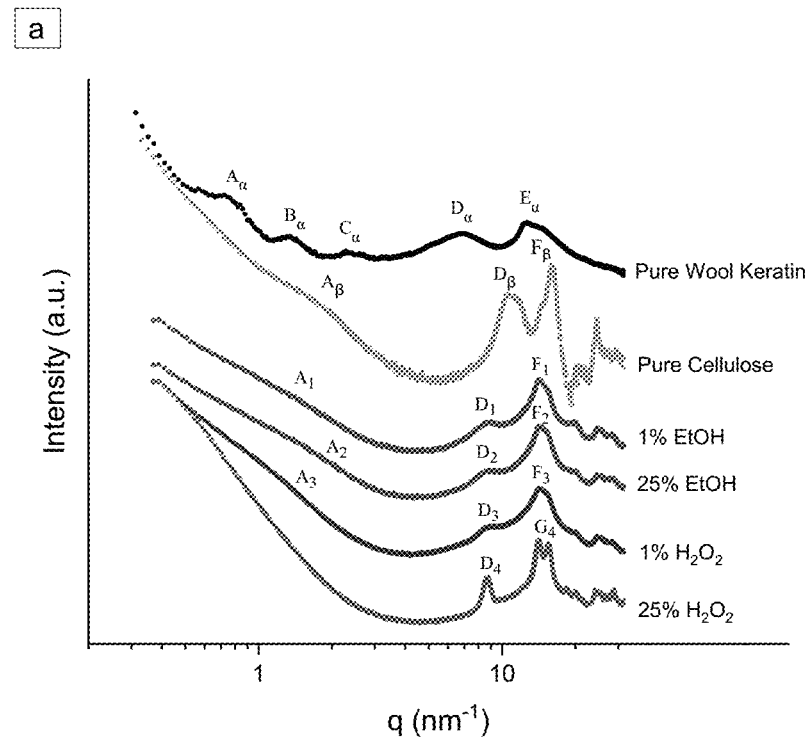
Figure 14B:
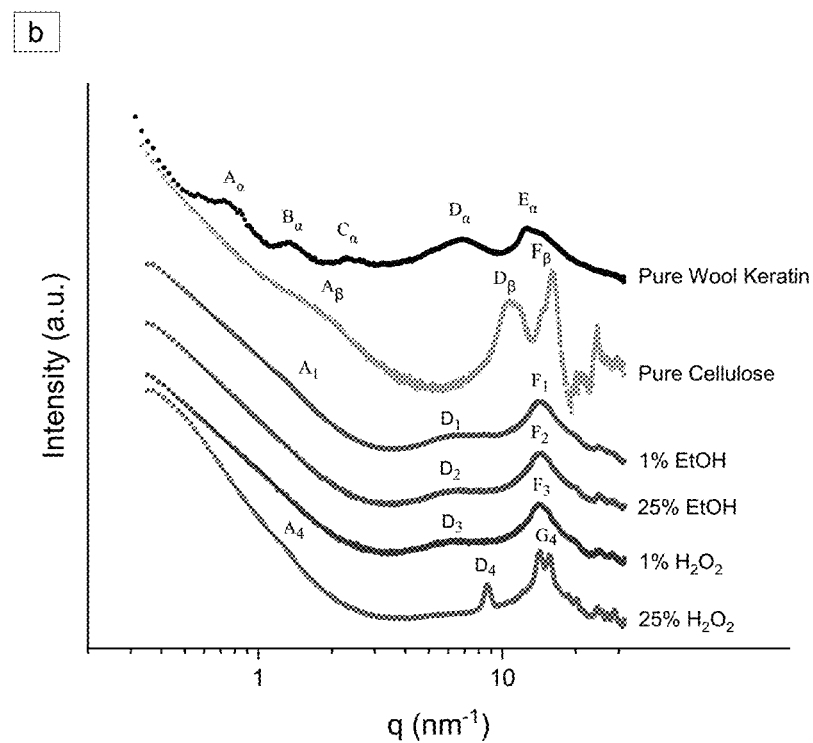

FIGS. 14A-14B show X-ray scattering profiles of pure cellulose, pure wool keratin, and biocomposite films regenerated in various coagulant baths (listed on legend): 25% wool keratin 75% cellulose (FIG. 14A) and 75% wool keratin 25% cellulose (FIG. 14B).

FIG. 15 shows a table with peak q and d values in inverse nanometers calculated from x-ray scattering 1-D profiles for pure materials and biocomposite samples.

Figure 16:
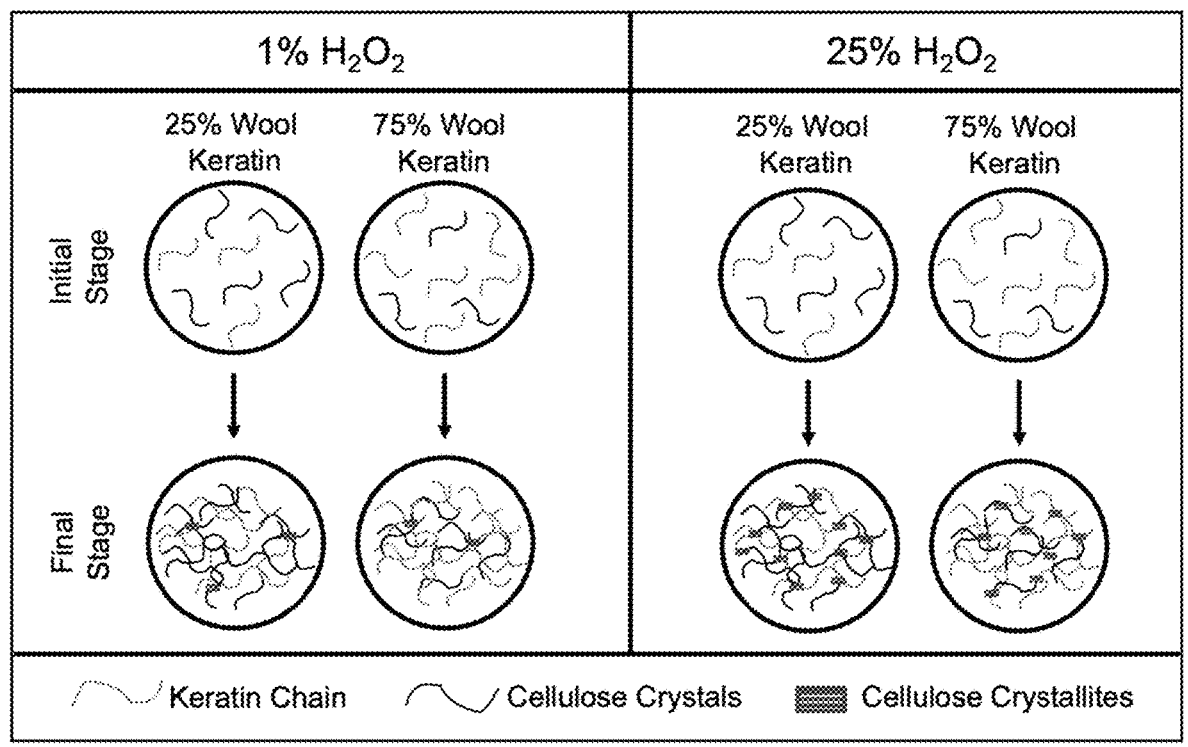

FIG. 16 shows the structural mechanism of the natural self-assembled wool keratin/cellulose films, both 25% and 75% wool keratin, coagulated with 1% and 25% hydrogen peroxide.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference.

In the methods described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Definitions

The term "about" as used herein can allow for a degree of variability in a value or range, for example, within 10%, within 5%, or within 1% of a stated value or of a stated limit of a range, and includes the exact stated value or range.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a-C_b)$hydrocarbyl or $C_{a-b}$ hydrocarbyl, wherein a and b are integers and mean having any of a to b number of carbon atoms. For example, $(C_1-C_4)$ hydrocarbyl means the hydrocarbyl group can be methyl $(C_1)$, ethyl $(C_2)$, propyl $(C_3)$, or butyl $(C_4)$, and $(C_0-C_b)$ hydrocarbyl means in certain embodiments there is no hydrocarbyl group.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

The term "solvent" as used herein refers to a liquid that can dissolve a solid, liquid, or gas. Non-limiting examples of solvents include silicones, organic compounds, water, alcohols, ionic liquids, and supercritical fluids.

The term "independently selected from" as used herein refers to referenced groups being the same, different, or a mixture thereof, unless the context clearly indicates otherwise. Thus, under this definition, the phrase "$X^1$, $X^2$, and $X^3$ are independently selected from noble gases" would include the scenario where, for example, $X^1$, $X^2$, and $X^3$ are all the same, where $X^1$, $X^2$, and $X^3$ are all different, where $X^1$ and $X^2$ are the same but $X^3$ is different, and other analogous permutations.

The term "room temperature" as used herein refers to a temperature of about 15° C. to 28° C.

The term "standard temperature and pressure" as used herein refers to 20° C. and 101 kPa.

Methods of Increasing Cellulose Crystal Size

The disclosure provides in one aspect methods of increasing cellulose crystal size, and/or of increasing crystallinity and crystal size in cellulose compositions that are at least partially non-crystalline. In certain embodiments, the method includes providing a mixture of at least one solvent comprising an ionic compound and a first composition comprising cellulose. In certain embodiments, the method further includes coagulating the mixture with a second composition comprising hydrogen peroxide, thereby increasing cellulose crystal size, crystallinity, and/or crystal size. In various embodiments, increasing the cellulose crystal size includes converting a sample of cellulose I into cellulose II. In various embodiments, the methods of increasing cellulose crystal size include dissolution of cellulose I, cellulose III, and mixtures thereof, followed by recrystallization to cellulose II. Naturally occurring cellulose is primarily (>90%) cellulose I, which contains parallel strands of β-1,4-d-anhydroglycopyranose without any intersheet hydrogen bonding. Cellulose II contains antiparallel sheets with intersheet hydrogen bonding. In various embodiments, the method of increasing cellulose crystal size described herein converts cellulose I, cellulose III, or a mixture thereof, in a sample into cellulose II, such that the conversion is about or at least about 5, 10, 15, 20, 25, 30, 35, 40, 45, 50, 55, 60, 65, 70, 75, 80, 85, 90, 95, 97, 998, 99, 99.9, or 100% complete. Thus, for example, in a conversion that is 50% complete, 50% of cellulose I in a sample is converted into cellulose II.

In certain embodiments, the ionic compound is dissolved in the solvent. Suitable ionic compounds that are dissolved in the solvent include halide salts of alkali earth metals, and the like. For example, in certain embodiments, the ionic compound can be LiF, LiCl, LiBr, LiI, NaF, NaCl, NaBr, NaI, and the like. In various embodiments, the ionic compound is LiBr. Suitable solvents include polar aprotic solvents such as, for example, N,N-dimethylformamide (DMF), dimethyl sulfoxide (DMSO), tetrahydrofuran (THF), N-methyl-2-pyrrolidone (NMP), ethylene carbonate, and the like. In certain embodiments, the solvent can be any solvent that dissolves both the ionic compound and the cellulose. In other embodiments, the solvent is an ionic liquid, which itself can be the ionic compound. In yet other embodiments, when the solvent is an ionic liquid, other ionic compounds, such as metal salts, are not dissolved in the ionic liquid. In yet other embodiments, when the solvent is an ionic liquid, other ionic compounds, such as metal salts, are dissolved in the ionic liquid.

In certain embodiments, the first composition can be about 1% to about 99% w/w of the mixture. The first composition can be, in certain embodiments, about 1, 2, 3,4, 5, 6, 7, 8, 10, 12, 14, 16, 18, 20, 22, 24, 26, 28, 30, 32, 34, 36, 38, 40, 42, 44, 46, 48, 50, 55, 60, 65, 70, 75, 80, 85, 90, 95, 96, 97, 98, or 99% w/w of the mixture.

In certain embodiments, the cellulose content can be about 1% to about 100% w/w of the first composition. The cellulose content can be, in certain embodiments, about 1, 2, 3,4, 5, 6, 7, 8, 10, 12, 14, 16, 18, 20, 22, 24, 26, 28, 30, 32, 34, 36, 38, 40, 42, 44, 46, 48, 50, 55, 60, 65, 70, 75, 80, 85, 90, 95, 96, 97, 98, 99, or 100% w/w of the first composition. Suitable cellulose materials include at least one of microcrystalline cellulose, amorphous cellulose, cellulose fibers, films, gels, foams, other cellulose derivatives, or combinations thereof. In certain embodiments, the amorphous cellulose is derived from a plant source.

In certain embodiments, the first composition further comprises a second material that can be at least one of a protein (such as silk, keratin, collagen, elastin), polysaccharide (such as chitin, chitosan, hyaluronic acid), synthetic polymer (such as polylactic acid, polycaprolactone, poly(methyl methacrylate)), and inorganic material (such as graphene, carbon nanotubes, reduced graphene oxide), nucleic acids (such as DNA or RNA), or combinations thereof. The amount of the second material in the first composition can be about 1% to about 99% w/w of the first composition. The second material can be, in certain embodiments, about 1, 2, 3,4, 5, 6, 7, 8, 10, 12, 14, 16, 18, 20, 22, 24, 26, 28, 30, 32, 34, 36, 38, 40, 42, 44, 46, 48, 50,55, 60, 65, 70, 75, 80, 85, 90, 95, 96, 97, 98, or 99% w/w of the first composition.

In various embodiments, inclusion of reduced graphene oxide can enhance cellulose crystal size in the methods described herein. The reduced graphene oxide can be present in an amount of about 0.01% to about 50% w/w of the first composition. In various embodiments, the amount of reduced graphene oxide can be about 0.01, 0.05, 0.1, 0.2, 0.3, 0.4, 0.5, 0.6, 0.7, 0.8, 0.9, 1, 2, 3,4, 5, 6, 7, 8, 10, 12, 14, 16, 18, 20, 22, 24, 26, 28, 30, 32, 34, 36, 38, 40, 42, 44, 46, 48, or 50% w/w of the first composition. The amount of reduced graphene oxide can enhance (increase) the crystallinity of cellulose when included in the methods described herein by at least about, or about 5, 10, 15, 20, 25, 30, 35, 40, 45, 50, 55, 60, 65, 70, 75, 80, 85, or 90% relative to a method that does not include an amount of the reduced graphene oxide.

As discussed herein, the solvent can be an ionic liquid. In certain embodiments, the cationic portion of the ionic liquid is at least one of an imidazolium-derivative, ammonium-derivative, morpholinium-derivative, amidinium-derivative, guanidinium-derivative, or combinations thereof. In certain embodiments, the cationic portion of the ionic liquid is at least one of

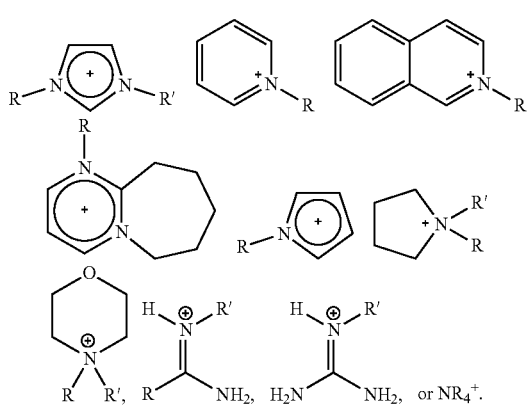

wherein each occurrence of R and/or R' is independently hydrogen or a $C_{1-5}$ hydrocarbyl.

In certain embodiments, the anionic portion of the ionic liquid is at least one of $F^-$, $Cl^-$, $Br^-$, $I^-$, $R''(C=O)O^-$, $CN^-$, $PF_6^-$, $BF_4^-$, $CF_3SO_3^-(CF_3SO_3)_2N^-$, $R''OSO_3^-$, and $AlCl_4^-$, wherein R" is hydrogen or a $C_{1-12}$ hydrocarbyl. In certain embodiments, the ionic liquid comprises 1-ethyl-3-methylimidazolium acetate. In certain embodiments, the ionic liquid comprises 1-ethyl-3-methylimidazolium chloride.

In certain embodiments, the coagulating step comprises contacting the mixture with the second composition containing hydrogen peroxide. The mixture can, for example, be added to a container, vessel, or mold that contains the second composition, or vice versa. In certain embodiments, the second composition contains water. In certain embodiments, the hydrogen peroxide is about 1% to about 30% v/v of the second composition, with the remainder being water. The hydrogen peroxide, in certain embodiments, can be at least about, or about 1, 2, 3, 4, 5, 6, 7, 8, 9, 10, 11, 12, 13, 14,1 5, 16, 17, 18, 19, 20, 21, 22, 23, 24, 25, 26, 27, 28, 29, or about 30% v/v of the second composition. In various embodiments, the hydrogen peroxide is about 1-3, 3-5, 5-7, 7-9, 9-11, 11-13, 13-15, 15-17, 17-19, 19-21, 21-23, 23-25, 25-27, 27-29, or 29-30% v/v of the second composition. In various embodiments, the first and second compositions are free of any substance, such as a catalyst, that can affect the crystallization of cellulose.

The second composition and the mixture can be in contact for a period of about 1 to about 60 hours, or about 1 to about 60 minutes. In certain embodiments, the second composition and the mixture can be in contact for about 1, 2, 3, 4, 5, 6, 7, 8, 9, 10, 12, 18, 24, 30, 36, 42, 48, 54, or about 60 hours. In certain embodiments, the second composition and the mixture can be in contact for about 1, 2, 3, 4, 5, 6, 7, 8, 9, 10, 12, 18, 24, 30, 36, 42, 48, 54, or about 60 minutes. In certain embodiments, the contacting is for a period of about 48 hours.

In certain embodiment, the cellulose crystal size increases by about 10% to about 80% as determined by X-ray crystallography. The crystal size can be, in some embodiments, determined by X-ray crystallography using Cu $K_\alpha$, X-ray radiation with 110 reflections collected at a 20 range of 15 to 45°. The cellulose can increase in crystal size by about 10, 15, 20, 25, 30, 35, 40, 45, 50, 55, 60, 65, 70, 75, or about 80%. The measured increase in crystal size can be based on the change in crystal size from the cellulose before coagulation with the second composition and after coagulation with this composition. The size increase can be based on the change in the largest dimension of the crystal, for example. The coagulation can, in certain embodiments, cause amorphous cellulose to become crystalline, and in such cases the crystal size can be measured as described herein. For example, the method described herein can be applied to the Lyocell or Tencel processes or electrospinning processes to make cellulose fibers.

A cellulose-containing material produced by the methods described herein is also provided. The cellulose-containing material can be used in a variety of applications, including as materials in automobiles, airplanes, construction materials, insulation, packaging, and the like. The cellulose-containing material can be used alone or in combination with other non-biocomposite materials such as, for example, carbon fiber. In some embodiments, the cellulose-containing material produced by the methods described herein are suitable for the manufacture of electrolyte membranes suitable for use in batteries, antibacterial membranes; biologically compatible membranes suitable for tissue engineering applications, including the production of in vitro meats for consumer use; and separation//filtration membranes for heavy metal filtration from water and sewage systems.

EXAMPLES

Various embodiments of the present application can be better understood by reference to the following Examples which are offered by way of illustration. The scope of the present application is not limited to the Examples given herein.

Materials and Methods

Keratin Azure was purchased from Sigma Aldrich which originated from dye-impregnated sheep's wool. Avicel microcrystalline cellulose (Techware: Z26578-0) was acquired from Analtech. Before use, the cellulose powder was placed in a vacuum oven at a temperature of 50° C. for 24 h. Silk cocoons of *Bombyx mori* mulberry silkworms were obtained from Treenway Silks (Lakewood, CO). In order to remove the sericin coated on the silk fibers, silkworm cocoons were boiled in a 0.02 M $NaHCO_3$(Sigma-Aldrich, USA) solution for 15 min, and then rinsed thoroughly with deionized water three times to remove the sericin completely. The degummed silk was air dried overnight and put into a vacuum oven at room temperature to remove any surface moisture. The ionic liquid, 1-ethyl-3-methylimidazolium acetate, was purchased from Sigma Aldrich and was pretreated before use. The ionic liquid ("IL") was placed in a vacuum oven at 50° C. for 24 h to ensure that the water molecules were removed from the solvent.

Dissolution of Protein and Polysaccharide

The total mass of the sample was composed of 90% ionic liquid and 10% polymers including, keratin and cellulose. For the various ratios tested, the 10% of the total sample mass was divided by the corresponding ratio of protein to polysaccharide. The protein: polysaccharide ratios included: 25:75 and 75:25. The pretreated ionic liquid was measured to be 90% by mass in a glass vial and placed into an 80° C. silica oil bath to ensure an even and consistent heating throughout the dissolution process. The keratin was cut into shorter strands and added to the vial first. Once the full dissolution of keratin was completed, using a magnetic stir bar, the cellulose was added in small portions. After the full dissolution of cellulose was complete, the solution was left to mix for 24 hours at a constant temperature of 80° C.

Preparation of Regeneration Biocomposite Films

After 24 hours of mixing, the blended protein-polysaccharide solution was then transferred to a 12 mm×12 mm×1 mm 3D printed mold, made of polylactic acid. To ensure the solution did not solidify while pipetting into the mold, a 1 mL micropipette tip was heated to 75° C. 15 minutes prior. After pipetting, the mold was transferred to a 250 mL beaker and submerged into 100 mL of the specific coagulation agent. The beaker was then sealed using parafilm for 48 hours. During this time, the protein-polysaccharide solution was regenerated while removing any remaining ionic liquid trapped within the blend. After 48 hours, the molds were removed from the coagulation baths, transferred to a closed Teflon petri dish and placed in a vacuum oven (30 inHg) at 50° C. for 24 hours to completely dry the resulting film.

Characterization of Cellulose Biocomposite

Fourier Transform Infrared Spectroscopy (FTIR)

FTIR analysis was performed using a Bruker's ALPHA-Platinum ATR-FTIR Spectrometer with Platinum-Diamond sample module. For each film, data was collected for a spectra range of 4000 $cm^{-1}$ to 400 $cm^{-1}$, including 128 background scans and 32 sample scans. This was completed for 6 different locations on the film and an average spectrum was collected. Acetone was used to clean the FTIR diamond and hammer in between each sample before the background test. The amide I region (1595 cm$^{-1}$-1705 cm$^{-1}$) was studied using Fourier-Self Deconvolution with a Lorentzian line shape, a 25.614 cm$^{-1}$ half-bandwidth, and a noise reduction factor of 0.3. The program Opus 7.2 was used to fit the lines that corresponded to the various vibrational band assignments within the amide I region. To allow for fitting results, Gaussian profiles were utilized and then integrated to find the area relating to a specific wavelength. To better show the functional groups within the spectra, the data was normalized using a min-max normalization from 4000 cm$^{-1}$ to 400 cm$^{-1}$.

Scanning Electron Microscopy (SEM)

SEM was performed using the Jeol JCM-6000 SEM instrument to analyze the topographical properties of the regenerated films. Images were taken at 500× magnification with a scale of 100 mm. The films were cut into rectangular pieces and placed into a Denton Desk II Au—Pd Sputter Coater. Once the system was set and stabilized to 75 millitorr, the samples were coated for 60 seconds resulting in a 200 mm thick Au—Pd coating. The samples were ready for SEM imaging after the Au—Pd coating was completely dry.

Thermogravimetric Analysis (TGA)

TGA was performed using the TA Instruments Discovery TGA system and 5 mg samples. All tests were performed with samples under a nitrogen gas purge of 25 mL/minute initially starting at 30° C. and kept isothermal at this temperature for one minute. The 5 mg samples were heated using a 10° C./minute ramp up until the temperature was 600° C. After each run, the furnace was cooled to 30° C. To determine the temperature of the onset of decomposition ($T_{onset}$) and the weight-loss percentage of the sample, the step transition analysis and derivative plots were used. Peak height analysis was performed to determine the temperature at which the sample decomposed at the highest rate ($T_{Dmax}$).

Differential Scanning Calorimetry (DSC)

DSC was performed using the TA Instruments differential scanning calorimetry equipped with a refrigerated cooling system, with a nitrogen gas flow rate of 50 mL min$^{-1}$. The 5 mg samples were enclosed in aluminum Tzero pans. The calibration process included indium for heat flow and temperature. The modulated procedure for DSC measurements included an equilibration to −40° C., a modulation period with temperature amplitude of 0.318° C. every 60 seconds, isothermal for 3 minutes, and an increase in temperature of 2° C./minute to 400° C. The calibration of heat flow and heat capacity was completed using aluminum and sapphire reference pans.

X-Ray Scattering

The morphological studies were conducted using a multiangle X-ray scattering system (DEXS) at the University of Pennsylvania under vacuum. The Xeuss 2.0 by XENOCS has a Cu X-ray source, computer controlled focusing and transmission incident sample geometries, a 1M pixel Pilatus detector (2D), and a smaller detector for simultaneous SAXS and WAXS. A high flux collimation was used with a slit of 1.2 mm×1.2 mm. Each sample containing a greater amount of keratin was run for 600s while the samples containing a greater amount of cellulose was run for 300s. The intensity reported is not absolute intensity and, thus, is reported in arbitrary units (a.u.). All samples were taped to a sample-holder and placed in a cabin under vacuum during X-ray scattering characterization. The X-ray scattering profiles were evaluated using Foxtrot 3.4.9; the isotropic 2-D scattering patterns were azimuthally integrated to yield intensity versus scattering vector.

Selected Results

Qualitatively, the regenerated films exhibited a hard and brittle quality for each film composed of 90% cellulose and 10% silk dissolved from the solvent, EMIMAc, and coagulated in two separate bath types, water and various concentrations of hydrogen peroxide of 1,2, 5, 10, 15, and 25% (v/v). Results from different characterization tests showed a positive correlation between higher concentrations of hydrogen peroxide solution and morphological crystallinity of the blended biomacromolecule film, specifically cellulose crystal size.

Structural Analysis (FTIR)

Figure 1:
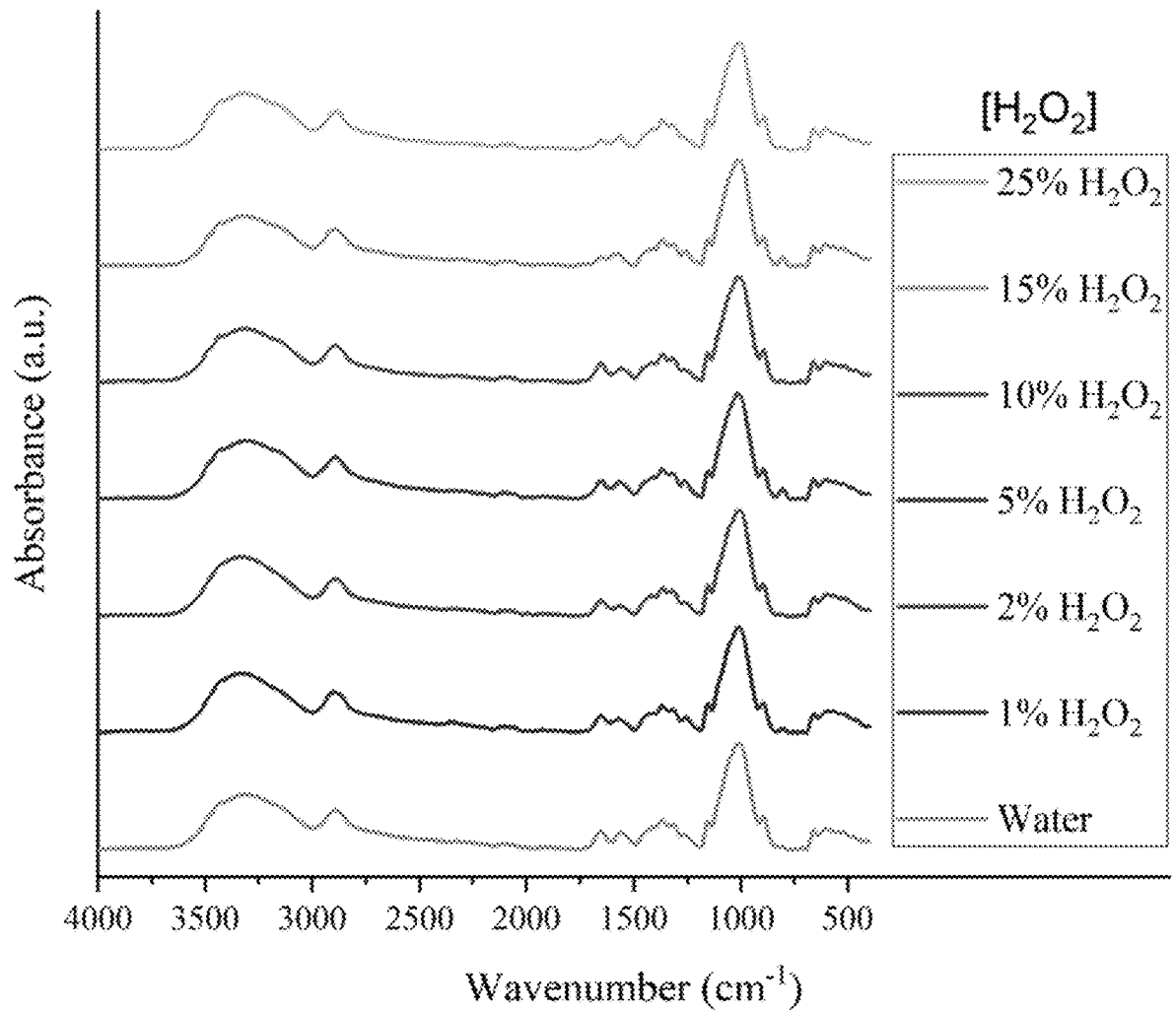
FIG. 1 shows normalized spectra of seven samples made with different coagulation baths (listed on legend). All sampled are composed of 90% cellulose-10% silk and dissolved in EMIMAc (1-ethyl-3-methylimidazolium acetate).
Figure 2:
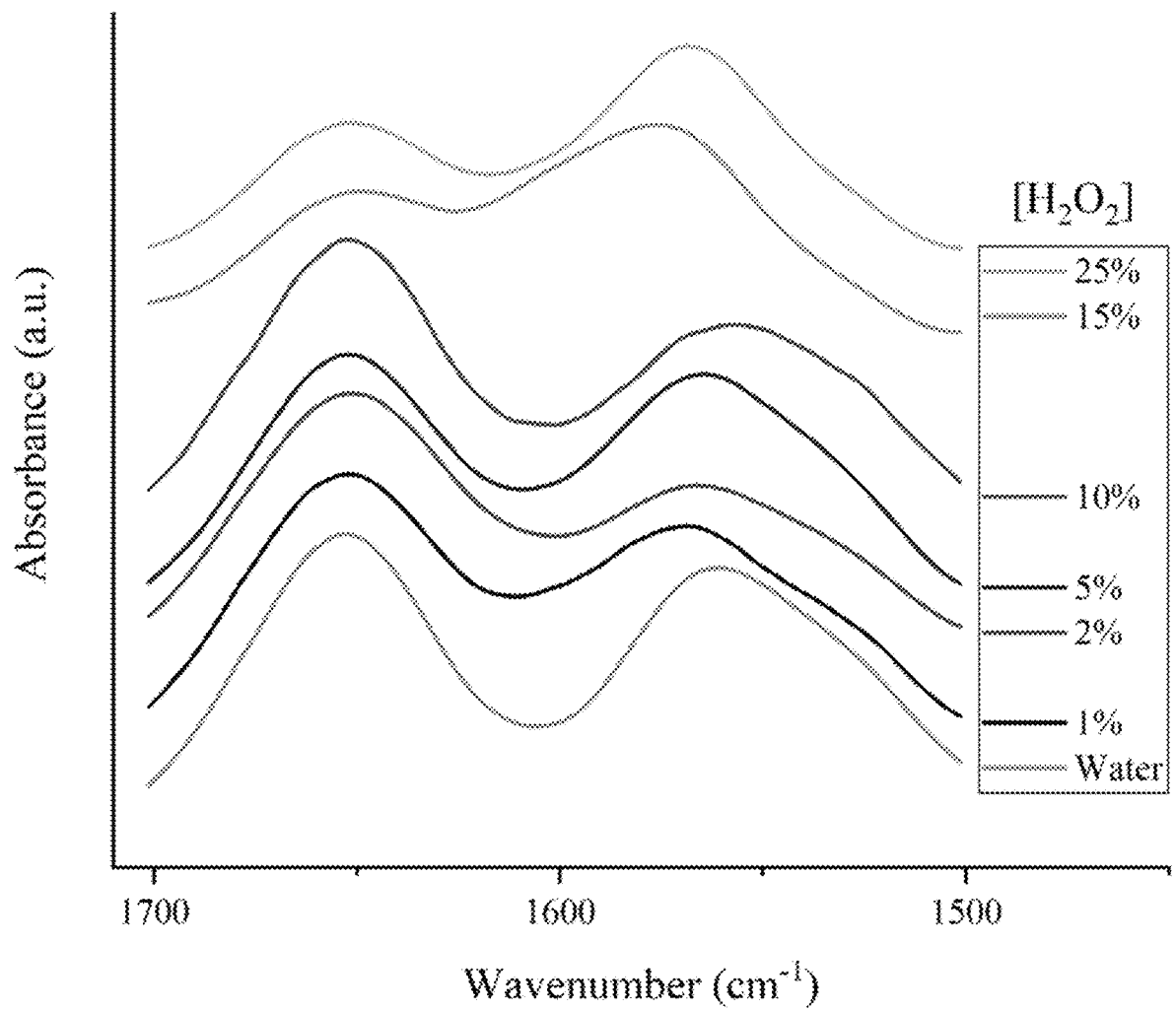
FIG. 2 shows the analysis of protein secondary structure percentages and zoomed-in spectra of the Amide I and II regions of seven samples made with coagulation baths containing varying percentages of $H_2O_2$ (listed on legend). All samples are composed of 90% cellulose-10% silk and dissolved in EMIMAc.
Figure 3:
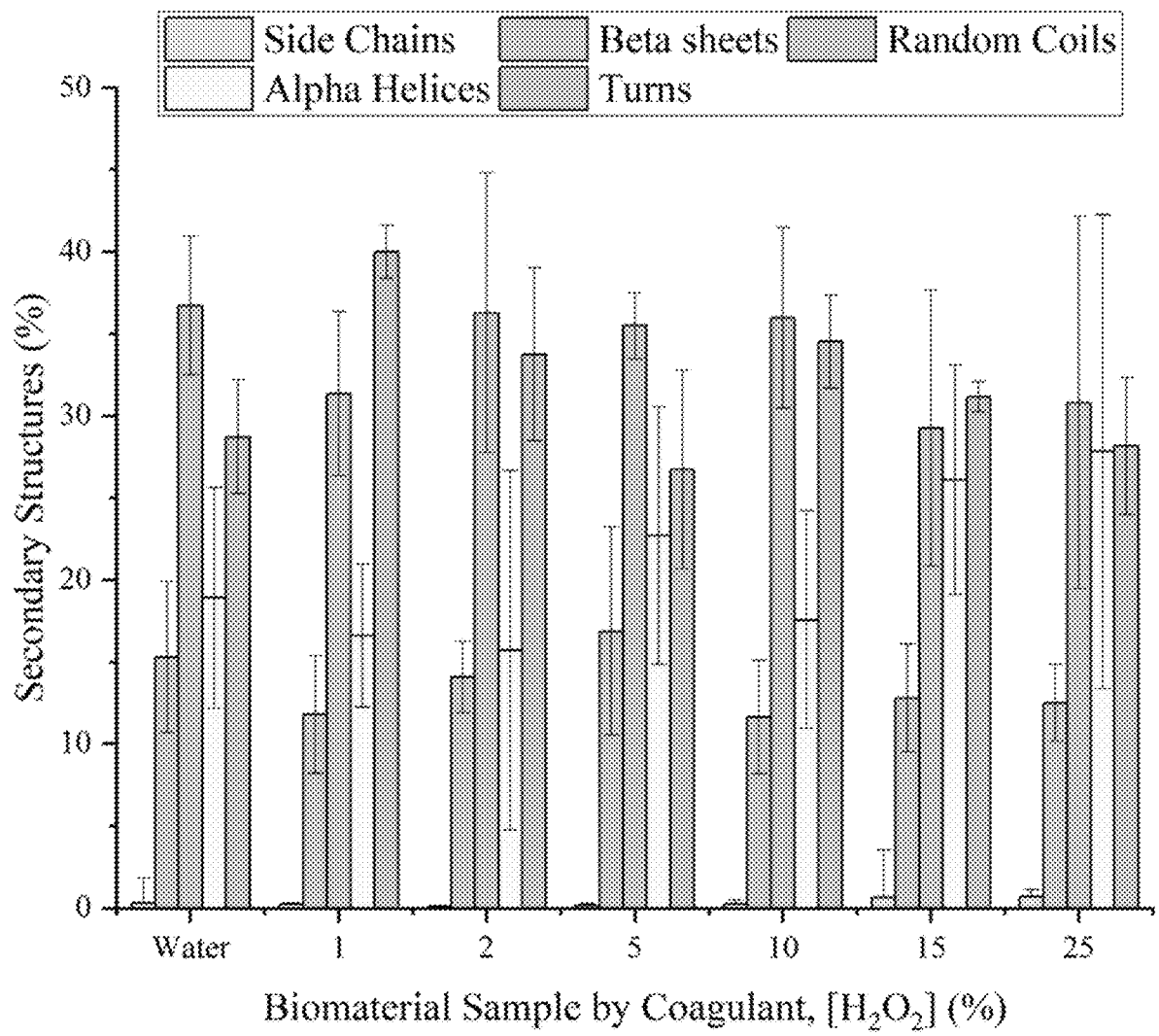
FIG. 3 shows the secondary structure percentages of 90% cellulose-10% silk samples from different coagulation baths.

Normalized data from Fourier transform infrared spectroscopy (FTIR) was used to identify the functional groups and fingerprint regions of each film, thus providing information on the integrity of the overall polymer blend. FIG. 1 shows absorbance peaks in 3600-3000 cm$^{-1}$, 3000-2750 cm$^{-1}$, and 1180-930 cm$^{-1}$ regions are represented by cellulose —OH, —CH, and —C—O stretchingmodes, respectively, within each sample. FIG. 2 shows the silk's amide I (1720-1600 cm$^{-1}$) and amide II (1590-1500 cm$^{-1}$) regions. This demonstrates that the biocomposites are well blended. Fourier Self-Deconvolution was used to analyze the silk's amide I and amide II regions for various secondary structure percentages, specifically side chains, β-sheets, random coils, α-helices, and turns. FIG. 3 shows subtle correlations between hydrogen peroxide concentration and secondary structure percentages of these regions.

In some embodiments, the results show that the hydrogen peroxide concentration as the sole variable does not affect silk crystalline structures, i.e. β-sheet formation. The data shows that the alpha helices content seem to be linearly depend on hydrogen peroxide content. This effect is apparent at higher coagulation concentrations. This means that at some point, the silk molecular chains become assembled, thus resulting in an increased change of helical structure formation from a random formation shown at lower concentrations of hydrogen peroxide. Applying the standard deviation, the results show a change as a function of hydrogen peroxide content.

Figure 8A:
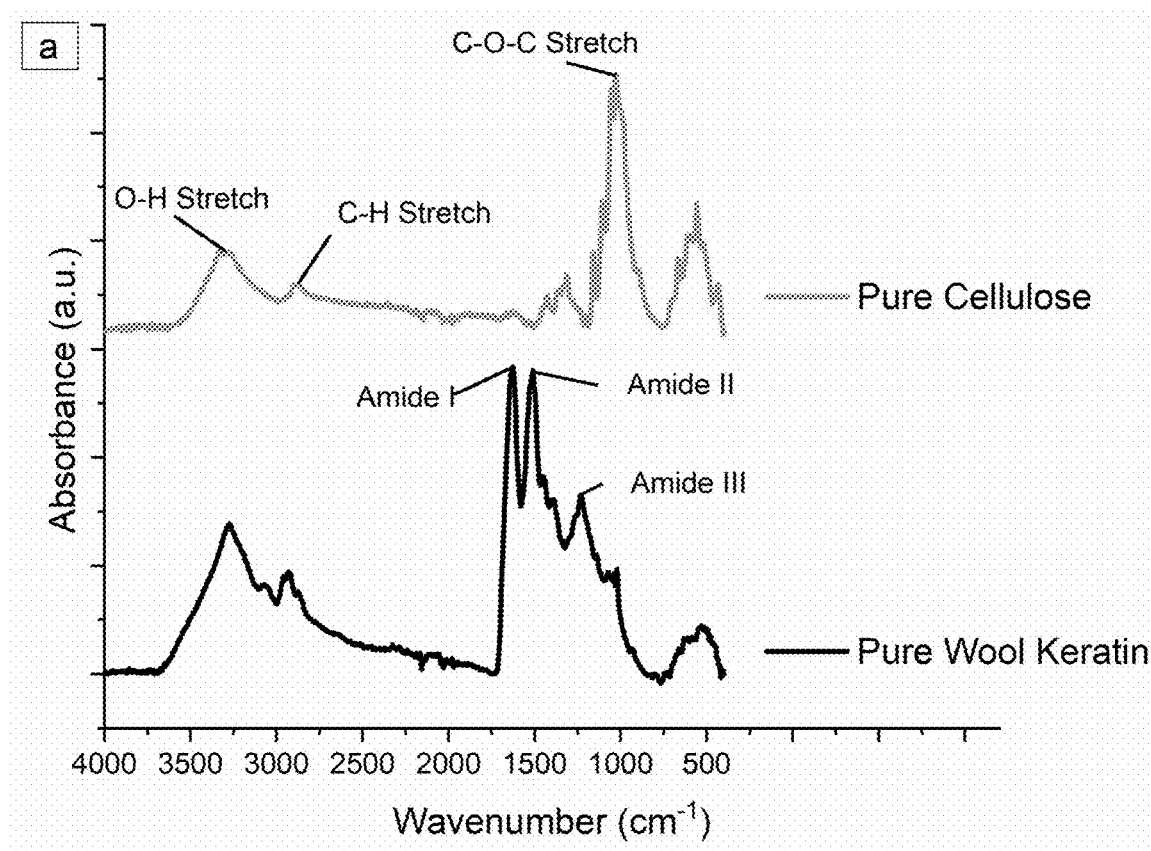
FIGS. 8A-8C show FTIR spectra of biomaterials.
Figure 8B:
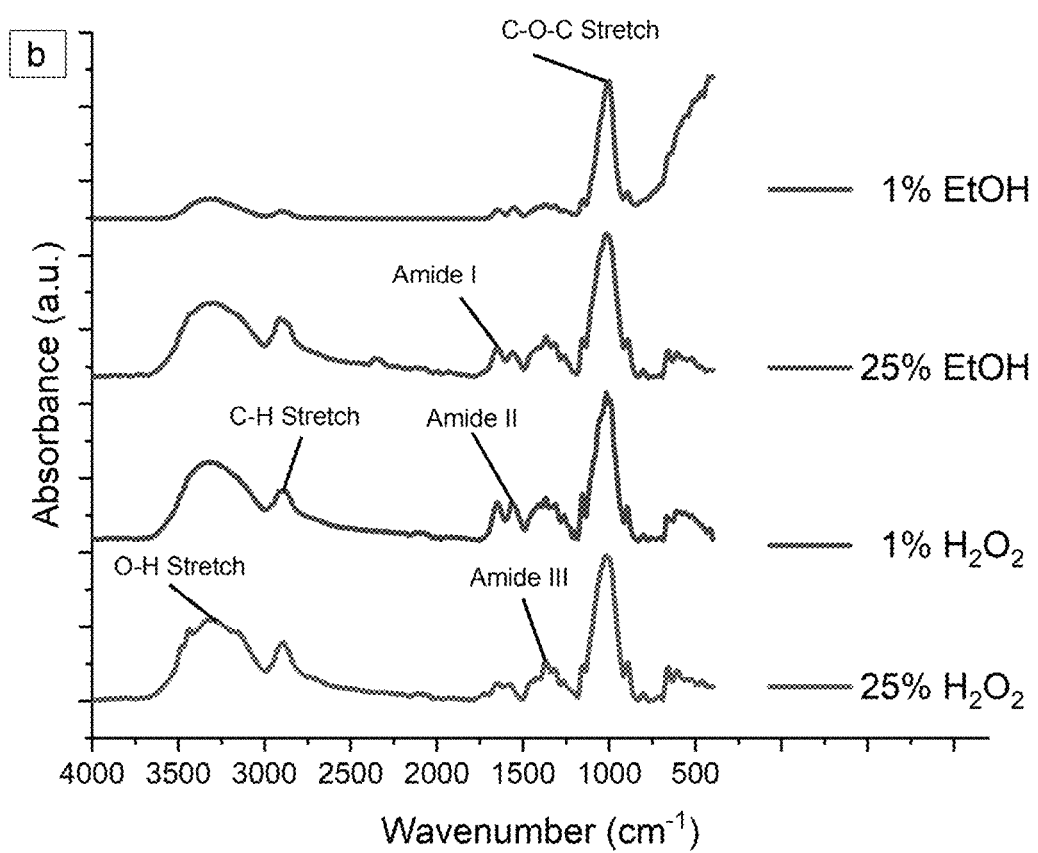
Figure 8C:
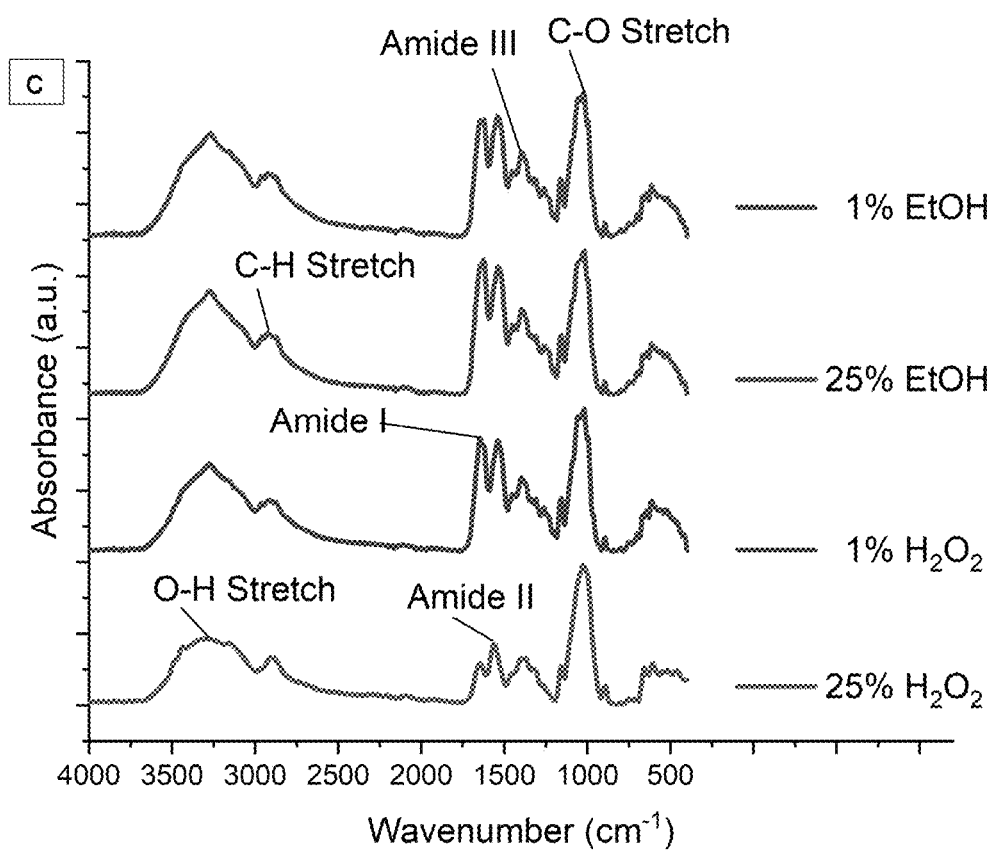
Figure 9A:
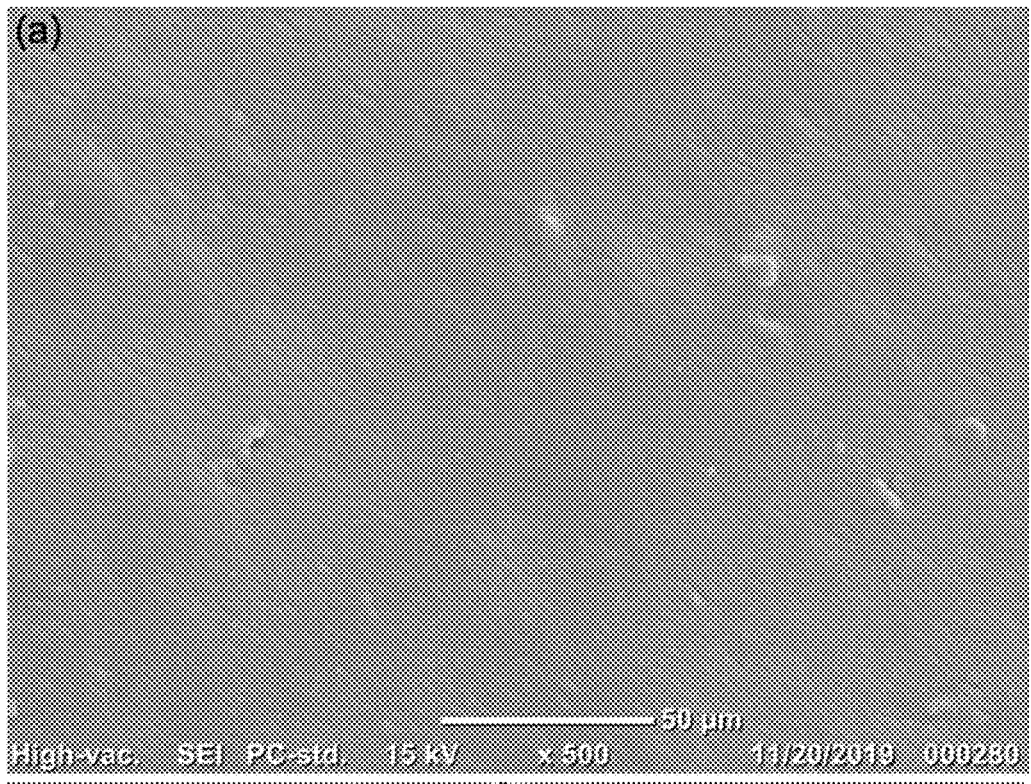
Figure 9B:
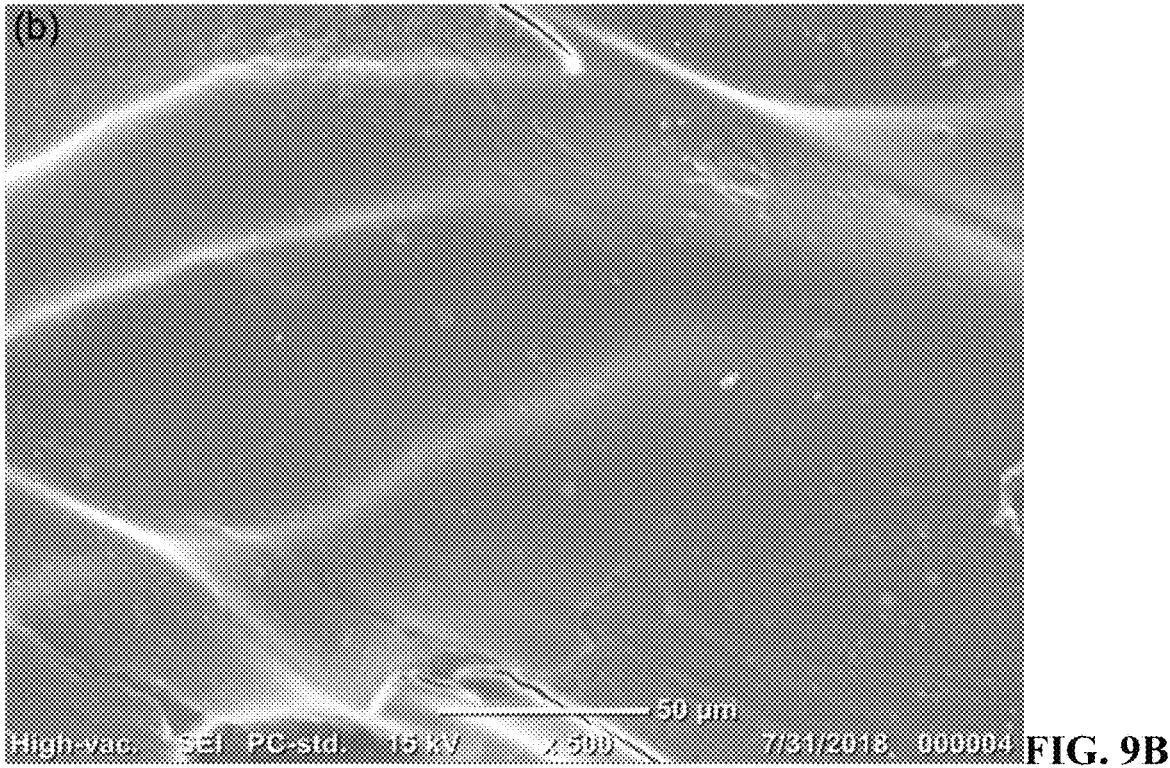
Figure 9C:
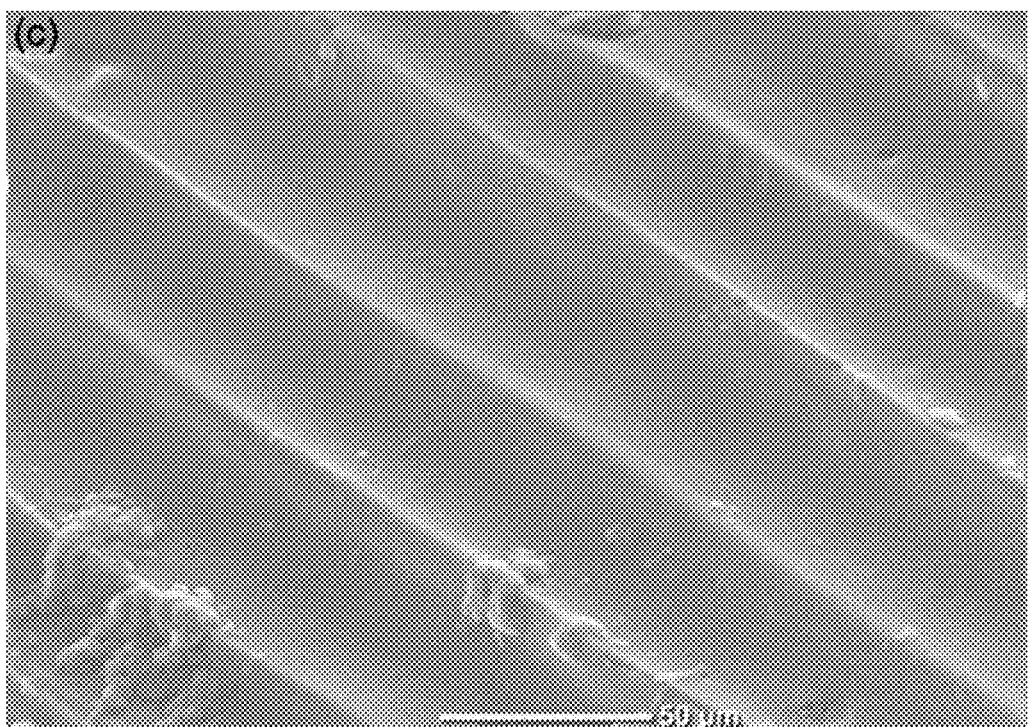
Figure 9D:
Figure 9E:
Figure 9F:
Figure 9G:
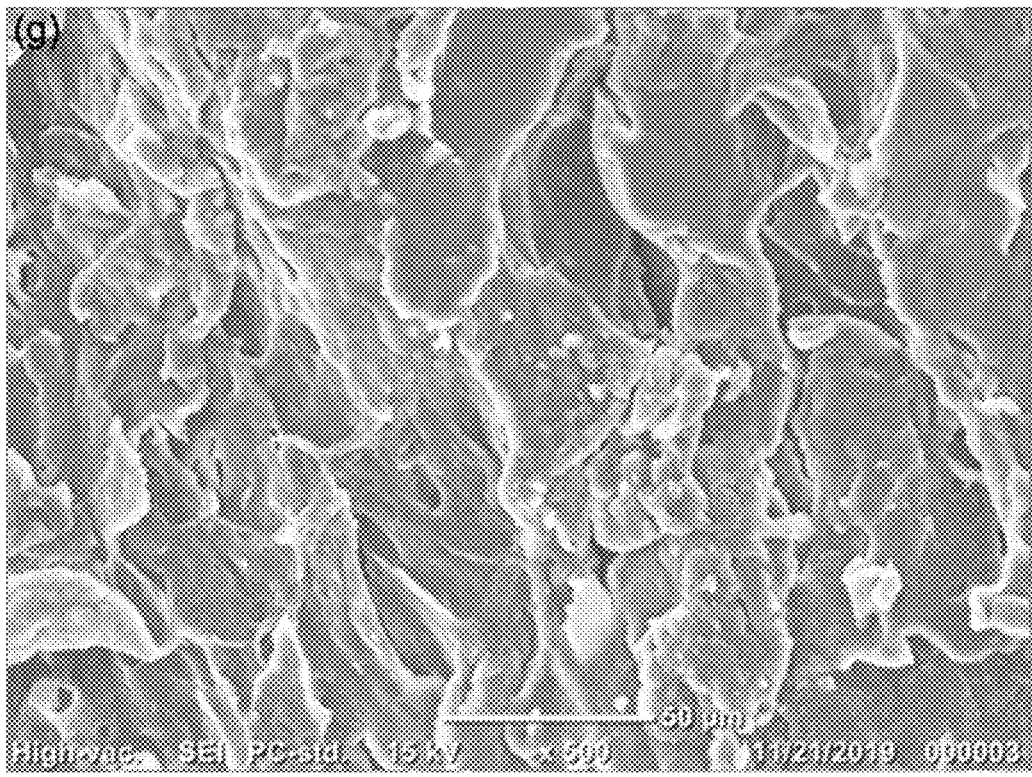
Figure 9H:

In FIGS. 8A-8C, the IR spectra were normalized to compare the peaks as well as the positions among the multiple samples. In all the IR spectra, the positions of the peaks remained constant while the subsequent absorbance values varied. The peaks visible in all spectra originating from cellulose within the regenerated films are: O—H stretch from approximately 3000 cm$^{-1}$ to 3550 cm$^{-1}$, the C—H stretch located at approximately 2900 cm$^{-1}$, and the C—O—C stretch at 1000 cm$^{-1}$, as seen in FIG. 8A. The peaks that correspond to the amide I and II regions are located from 1500-1700 cm$^{-1}$ and the amide III region is located around 1230 cm$^{-1}$. The amide regions originate from the wool keratin within the samples, as seen in FIG. 8B. The characterized cellulose and wool keratin peaks show to have consistent peak positions for all spectra.

The films composed of 75% wool keratin and 25% cellulose; FIG. 8C showed to have a sharper peak for the O—H stretch rather than a smooth, round curve. This could be due to a lower percentage of cellulose and contributing from the higher percentage of wool keratin, as seen in the spectrum of the pure samples. As the percentage of wool keratin within the sample increased, the corresponding absorbances for the amide peaks also increased, signifying that the different percentages of wool keratin have been successfully regenerated. The next peak, at approximately 1160 cm$^{-1}$, is a small peak that corresponds to the C—N stretch found in the imidazolium ring, indicating a miniscule amount of remaining ionic liquid within the film. Overall, changes in the coagulation agent did not appear to have any substantial effects on the resulting spectra.

The amide I region on the FTIR spectra, located from 1720 cm$^{-1}$ to 1590 cm$^{-1}$, of the regenerated samples were analyzed using Fourier Self-Deconvolution. The calculated secondary structure percentages and each standard deviation are displayed in Table 1. Most of the films composed of 25% wool keratin 75% cellulose had either approximately 1% or less side chains. The percentages for α-helices in this percent composition of wool keratin remain consistent, only varying by a maximum of 4.34% and showed to be unaffected by the changes in the coagulation bath. However, in the 75% wool keratin 25% cellulose films the side chains were greater than 1%, the largest reported value being 5.72%±3.0909. The α-helices for this composition showed to increase as the percentages of the coagulation baths increased.

The percentage of β-sheets, random coils, and turns showed to have the highest percentages overall, contributing to the secondary structure of the films the most. Previous studies have shown that the percentage of ethanol used as the coagulation agent increased the resulting percentage of β-sheets within the sample. This trend is also present in this study as the percentage of ethanol increased, the β-sheet content also increased by 0.7% and 2.01% for the 25% and 75% wool keratin composition films, respectively. As the percentage of hydrogen peroxide increased, the inverse relationship was exhibited, and β-sheet percentage decreased. Overall, the films coagulated in 25% ethanol had the highest percentage of β-sheets while the film coagulated in 25% hydrogen peroxide showed to have the lowest percentage.

The films with 25% wool keratin had a higher percentage for random coils than the 75% wool keratin films. When the percentage of ethanol was increased, the resulting percentage of random coils decreased. This change was very apparent in the 25% wool keratin films as the maximum difference was 14.32%, and in the 75% keratin films the difference was 7.68%. The percentage of turns varied the most for the 25% wool keratin samples regenerated in ethanol and for the 75% wool keratin samples regenerated in hydrogen peroxide.

TABLE 1

Percentages of secondary structures and corresponding standard deviation of the keratin regenerated films in various coagulation baths.

| Sample Ratios | Coagulant Bath | Side Chains | β-Sheets | Random Coils | α-Helices | Turns |
|---|---|---|---|---|---|---|
| 25% Wool Keratin 75% Cellulose | 1% EtOH | 1.16% ± 0.8099 | 27.74% ± 5.7462 | 43.05% ± 11.3964 | 11.99% ± 5.4172 | 16.06% ± 3.2847 |
| | 25% EtOH | <1% ± 0.1728 | 28.44% ± 3.7655 | 28.73% ± 8.8342 | 16.33% ± 1.5144 | 26.30% ± 5.5146 |
| | 1% H$_2$O$_2$ | <1% ± 0.2742 | 20.27% ± 5.6644 | 30.87% ± 6.3163 | 16.08% ± 10.7385 | 32.57% ± 3.6297 |
| | 25% H$_2$O$_2$ | <1% ± 0.1315 | 18.44% ± 6.6641 | 36.25% ± 9.9052 | 16.01% ± 12.7935 | 29.13% ± 8.0081 |
| 75% Wool Keratin 25% Cellulose | 1% EtOH | 4.05% ± 02.9618 | 31.57% ± 3.9183 | 30.89% ± 7.6853 | 2.87% ± 6.1017 | 30.61% ± 5.5504 |
| | 25% EtOH | 3.05% ± 1.3925 | 33.58% ± 4.4678 | 23.21% ± 4.8278 | 5.11% ± 4.6341 | 35.04% ± 11.0767 |
| | 1% H$_2$O$_2$ | 5.72% ± 3.0909 | 30.21% ± 5.5397 | 27.75% ± 5.6008 | 15.70% ± 3.4946 | 20.62% ± 3.4513 |
| | 25% H$_2$O$_2$ | <1% ± 0.0754 | 22.88% ± 6.7462 | 13.48% ± 1.5869 | 34.28% ± 12.7321 | 29.33% ± 5.3219 |

Scanning Electron Microscopy (SEM)

SEM was performed to illustrate the morphological effects upon the topology of the regenerated films and is shown in FIGS. 9A-9H. As a function of protein percentage, the regenerated films with 25% wool keratin showed to have an overall smoother surface. Changing the coagulation agent or the coagulation agent concentration did not result in any significant differences. The homogeneous surface of the resulting films indicated that the protein and polysaccharide were properly dissolved as there were no visible strands of wool keratin or substantial fragments of cellulose on the surface. Some of the films exhibited striations that ran the entire length of the film. This was considered to be an artifact of the system, which was a result of the mold in which the films were regenerated and dried in.

The regenerated films with 75% wool keratin showed to have more prominent areas of roughness. This degree of roughness was more extreme at a lower percentage of hydrogen peroxide, compared to the films coagulated in ethanol. These films also showed to have areas of irregularities, visible cellulose particles on the surface, possibly resulting from the initial dissolution of wool keratin and cellulose. As the percentage of the coagulation agent increased, the resulting films showed to have a smoother surface. This was clearly seen in the 75% wool keratin films coagulated in 1% and 25% hydrogen peroxide.

Thermogravimetric Analysis (TGA)

Figure 4:
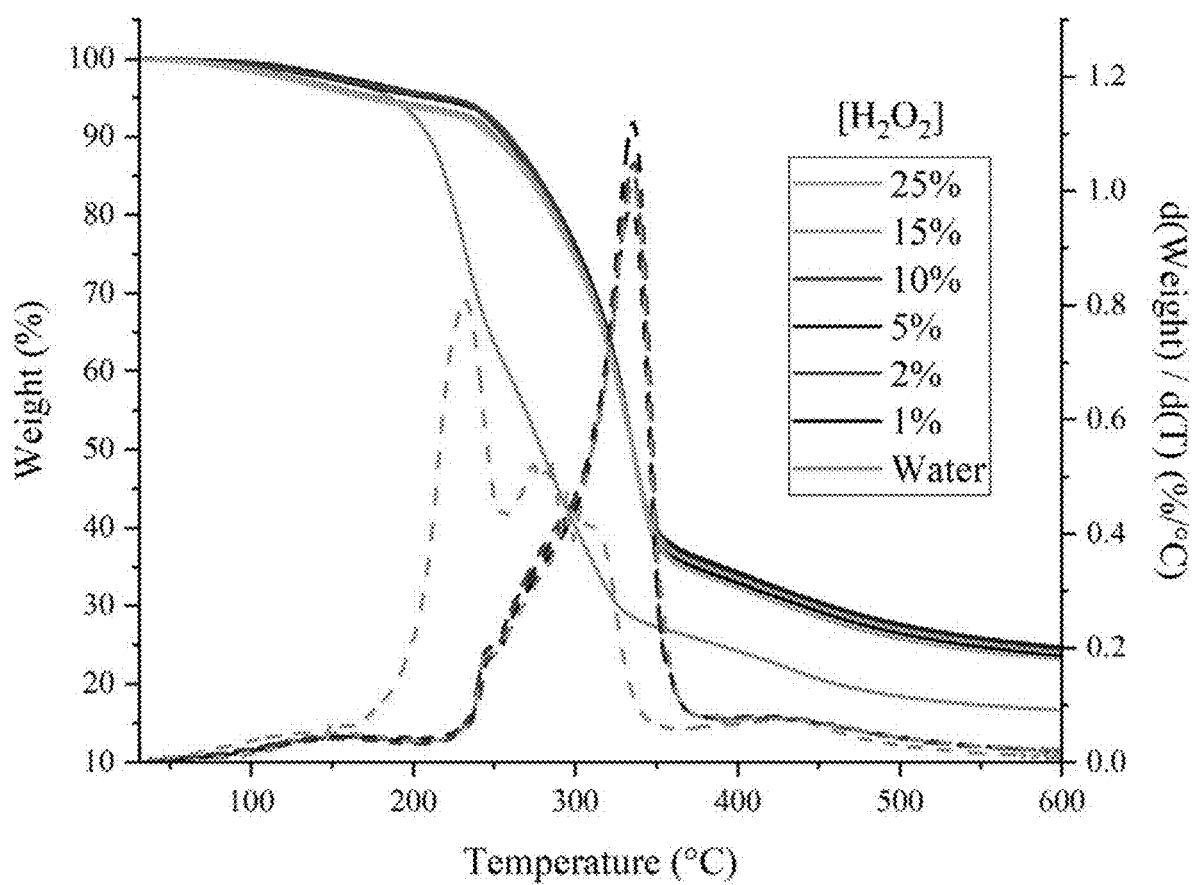
FIG. 4 shows a thermogram of decomposition rates of seven samples of different coagulation baths (listed on legend) with their derivatives (dashed lines). 90% cellulose-10% silk, dissolved in EMIMAc.

The thermal properties were analyzed by TGA to determine each samples' decomposition in weight over time as the temperature increases from 30° C. to 600° C. FIG. 4 shows a thermogram with a range of temperature onsets between 292.0° C. and 298.3° C. for various concentrations of hydrogen peroxide-coagulated samples, while the data for the same film, except coagulated in pure water instead of hydrogen peroxide, showed a temperature onset at 209.5° C. Compared to the films coagulated with hydrogen peroxide solutions, the water-coagulated film's onset temperature decreased at least 82.5°. The percent mass decomposition was also evaluated for each sample; 71.5% of the sample coagulated in water was loss, while a range of 61.9% to 58.4% mass loss was shown in the hydrogen peroxide-coagulated films, confirming less thermal decomposition for the hydrogen peroxide-coagulated films compared to the film coagulated in water. FIG. 4 also shows the data's derivative (dashed lines) over increasing temperature; a trimodal peak was observed with a max peak height of 230° C. in the water-coagulated film's thermogram, affirming that there exists at least two to three stages of high decomposition rates in this material, thus showing the various formations of different polymer interfaces.

Modelling shows that for a protein-polysaccharide blend the interfaces between chains break down easily, so that a lot of small "pure" crystals are released. Immediately after initial decomposition, single chains are released from these interfaces and begin to decompose. Furthermore, the crystalline regions survive for a bit longer before melting and decomposing in a similar way. The data results are similar to such predictions. In continuation with the analysis, each biocomposite film coagulated in hydrogen peroxide showed a high decomposition rate at around 336° C. with a small shoulder at 275° C. This demonstrates that films coagulated in hydrogen peroxide are more thermally stable than the same type of film coagulated in water. The decomposition seen at the small shoulder of the thermogram is due to fewer interfaces between polymer chains for all biocomposites coagulated with hydrogen peroxide solutions. This is because it takes much less cohesive energy to break these interfaces compared to the actual disruption of the polymer chains themselves. Also, observations from the data point out that the thermal stability is independent of varying concentrations of hydrogen peroxide. In other words, a 1% hydrogen peroxide-coagulated film showed similarly high thermal stability to a film coagulated in as much as 25% hydrogen peroxide.

Additional comparisons of the different weight loss percentages, as well as the onset, end, and maximum temperatures of decomposition, are shown in Table 2. The analysis of the resultant thermograms and respective derivative weight-loss percentage thermograms also gave insight into the molecular properties of the films. The thermograms, FIGS. 10A-10B and FIGS. 11A-11B, show the weight loss percentage of each sample during the constant increase in temperature from 30° C. to 600° C. The weight loss of the biocomposite films, when heated to 100° C., could be attributed to the loss of water, and from 150 to 500° C. might be caused by the destruction of the chains of wool keratin protein molecules. The weight loss percentages, overall, are generally close together with the extremes varying at the most of 8.67%. However, the weight loss percentages for samples with a higher percentage of wool keratin are slightly higher than those of 25% wool keratin. A similar trend between the different composition percentages is seen within the onset temperatures. The 75% wool keratin samples showed to have slightly higher onset temperatures, except for the sample coagulated in 25% hydrogen peroxide. This shows that the percentage of wool keratin is able to influence the thermal stability within the samples. The time it took for the samples to fully degrade is in relation to the onset and end temperatures. This analysis showed that the 75% wool keratin samples had a smaller temperature range for the sample to fully degrade, in comparison to the 25% wool keratin samples. This can be related to the thermal stability and the influence the molecular structure can have on the samples. The films with a higher percentage of cellulose showed to degrade over a larger temperature range, as cellulose itself is very thermally stable.

The coagulation bath also functions in the tunability of the biocomposite films in terms of the mechanical properties. As a function of the coagulation bath, the onset temperatures increased as the percentage of ethanol and hydrogen peroxide increased. Only the 75% wool keratin films regenerated in a higher percentage of hydrogen peroxide showed to have the inverse relationship and a subsequent lower onset temperature. Overall, the choice of coagulation bath and the percentage only resulted in subtle changes to the thermal properties.

The derivative thermograms show the maximum temperatures of degradation ($T_{\Delta Max}$) and give insight into the interfaces of the molecular structure. The 75% wool keratin samples illustrated a unimodal thermogram with small shoulder peaks before the maximum temperature that resembled the thermogram of pure wool keratin. The temperature of maximum decomposition and the broadness of the derivative also resembled that of the pure wool keratin derivative thermogram. This suggests the regeneration of wool keratin within the films and that the higher amount of wool keratin films follows a similar trend as the pure sample. The films with a higher percentage of wool keratin also have a relatively smaller percentage of secondary structures attributable to an amorphous structure, and an overall higher percentage of crystalline secondary structures. The small shoulder peak seen prior to the temperature of maximum decomposition could show that the amorphous structures degraded at a lower temperature. This trend holds for the films with a higher percentage of wool keratin and a bimodal derivative, except the 25% hydrogen peroxide film that showed to have the lowest onset and maximum temperature of degradation.

On the contrary, the 25% wool keratin derivative thermograms showed to be bimodal. The 25% ethanol sample had a more prominent peak that could classify this thermogram to be trimodal. The secondary structure of the films with a lower percentage of keratin, showed to have a slightly smaller percentage of β-sheets and an overall higher percentage of the secondary structures that contributed to more amorphous regions. The amorphous regions, specifically the random coils and turns, show to slightly dominate the secondary structure over the more crystalline β-sheets.

The thermal stability of the regenerated keratin samples decreased compared to that of pure wool keratin due to the changes in the molecular structure during the dissolution and then subsequent regeneration of the protein in ionic liquid. This trend was seen as the pure samples had higher onset and end temperatures compared to that of the regenerated samples, as seen in Table 2. This could be due to the initial higher molecular weight and crystalline regions within the natural wool fibers and as the molecular chain within the regenerated samples was broken by the ionic liquid dissolution, the thermal stability slightly decreased, showing the role that the solvent can have on the thermal properties.

TABLE 2

Onset and end temperatures, total weight loss percentage, and maximum temperature of decomposition given by the derivative which represents the temperature at which the maximum weight loss occurred.

| Sample Ratios | Coagulant Bath | $T_{Onset}$ (° C.) | $T_{End}$ (° C.) | Weight Loss (%) | $T_{\Delta Max}$ (° C.) |
|---|---|---|---|---|---|
| Pure Wool Keratin | — | 261.79 | 352.13 | 64.00 | 309.81 |
| Pure Cellulose | — | 334.69 | 364.84 | 86.35 | 352.21 |
| 25% Wool Keratin 75% Cellulose | 1% EtOH | 220.02 | 315.06 | 66.12% | 241.76 |
| | | | | | 321.43 |
| | 25% EtOH | 229.66 | 324.06 | 61.81% | 252.77 |
| | | | | | 337.87 |
| | 1% $H_2O_2$ | 216.39 | 297.77 | 65.82% | 232.99 |
| | | | | | 281.99 |
| | 25% $H_2O_2$ | 224.92 | 332.22 | 63.80% | 253.83 |
| | | | | | 335.85 |
| 75% Wool Keratin 25% Cellulose | 1% EtOH | 239.07 | 327.21 | 67.22% | 288.59 |
| | 25% EtOH | 253.61 | 329.95 | 67.49% | 291.35 |
| | 1% $H_2O_2$ | 252.74 | 326.87 | 65.50% | 289.29 |
| | 25% $H_2O_2$ | 215.72 | 317.17 | 70.48% | 276.97 |

Differential Scanning Calorimetry (DSC)

In FIGS. 12A-12B and FIGS. 13A-13B, standard. DSC scans are shown for different samples of various wool keratin/cellulose percentages using ethanol and hydrogen peroxide as coagulation agents and EMIMAc as the ionic liquid. In FIGS. 12A and 12B, the degradation and crystallization peaks were determined using the total heat flow. In the 25% wool keratin samples, 1% ethanol and 25% hydrogen peroxide samples have a degradation peak at approximately 70° C. and 65° C., respectively. The 1% hydrogen peroxide sample has a degradation peak at a higher temperature of approximately 85° C., while the 25% ethanol sample seems to have only a slight degradation peak, much less defined and shifted to a higher temperature of approximately 95° C. These samples also all have two crystallization peaks with the first between 215 and 225° C. and the second peak around 295° C. and 300° C.

However, the 25% hydrogen peroxide does not have a well-defined first crystallization peak like the other three samples above it. Instead, it seems that there may be two smaller crystallization peaks before the third much sharper peak that lines up with the other samples. These 25% wool keratin samples differ from the 75% wool keratin samples in that the 75% wool keratin samples seem to have two degradation peaks and no distinct crystallization peaks. Again, there is a large degradation peak that ranges from 60° C. to 72° C. depending on the specific sample analyzed. This is followed by a second and much smaller degradation peak at approximately 250° C. for each of the four samples. When looking at the scans for all four samples, the 1% hydrogen peroxide and 25% hydrogen peroxide samples look as if they may have one and two very small crystallization peaks respectively. The first occurs right before the second degradation peak at 203° C., and the second for the 25% hydrogen peroxide occurs right after the degradation peak at 300° C.

In FIGS. 13A and 13B, the glass transition temperatures were determined using the reversing heat capacities. In the 25% wool keratin samples, it is seen these temperatures do not vary drastically from sample to sample. Specifically, there is only a 12.71° C. difference from the highest to lowest T g s corresponding to the 1% ethanol and 1% hydrogen peroxide samples, respectively. This differs from the 75% wool keratin samples where nearly all samples are the same except for the 1% hydrogen peroxide sample. The 1% ethanol, 25% ethanol, and 25% hydrogen peroxide samples have glass transition temperature that only vary by 1.1° C. However, it is seen the 1% hydrogen peroxide has a much lower glass transition temperature than these three samples. It is 11.81° C. lower than the highest glass transition temperature belonging to the 25% ethanol sample. When comparing samples of the same coagulation agent but different biocomposite ratio, it is seen that the 25% wool keratin samples had higher glass transition temperatures for each coagulant. In addition, when comparing the coagulation agents within the same biocomposite ratios, 1% and 25% ethanol glass transition temperatures vary less than the 1% and 25% hydrogen peroxide samples. This may be connected to secondary structures seen in the FTIR section. β-sheet content varies less between the 1% and 25% ethanol of the same biocomposite ratio than the 1% and 25% hydrogen peroxide of the same biocomposite ratio.

Morphological Analysis/X-Ray Scattering

Figure 5:
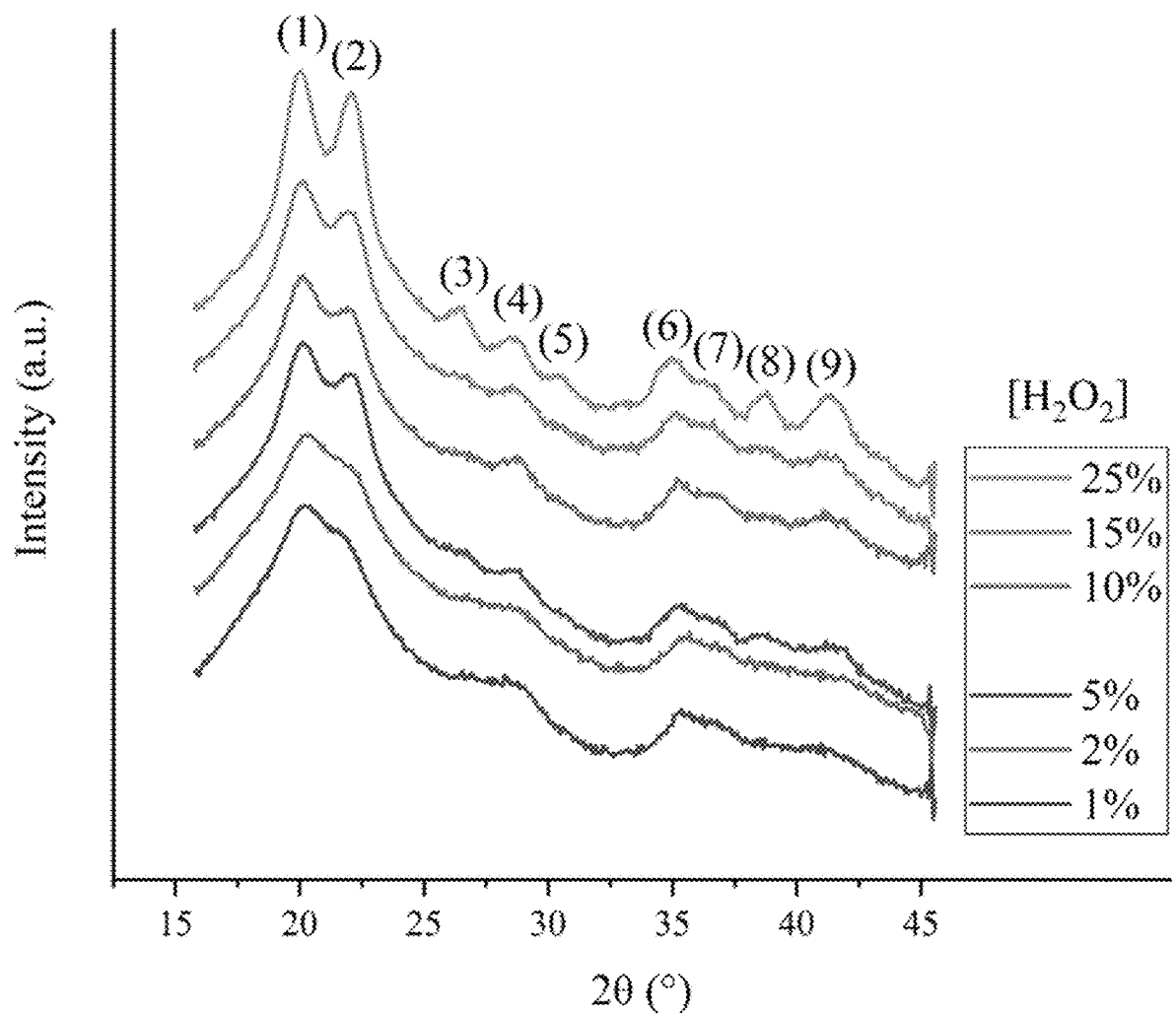
FIG. 5 shows wide angle scattering profiles of different biocomposites coagulated in various concentrations of hydrogen peroxide. 90% cellulose-10% silk, dissolved in EMIMAc.

FIG. 5 shows the X-ray scattering wide angle region in the 15 to 45° 2θ range for the various silk-cellulose films coagulated in various concentrations of hydrogen peroxide. Qualitatively, the results demonstrated that the X-ray scattering peak intensities increase as the coagulation agent concentration of hydrogen peroxide solution increases. The typical sharp crystallization reflection, which are characteristics of native microcrystalline Avicel cellulose Iβ (see FIG. 6), are not observed in the biocomposites that were coagulated with lower concentrations of hydrogen peroxide solution. Instead, these biocomposites show a broader region which is indicative of an amorphous structure. The amorphous structure gradually transforms into a semi-crystalline morphology as indicative of the typical peak sharpness.

Figure 6:
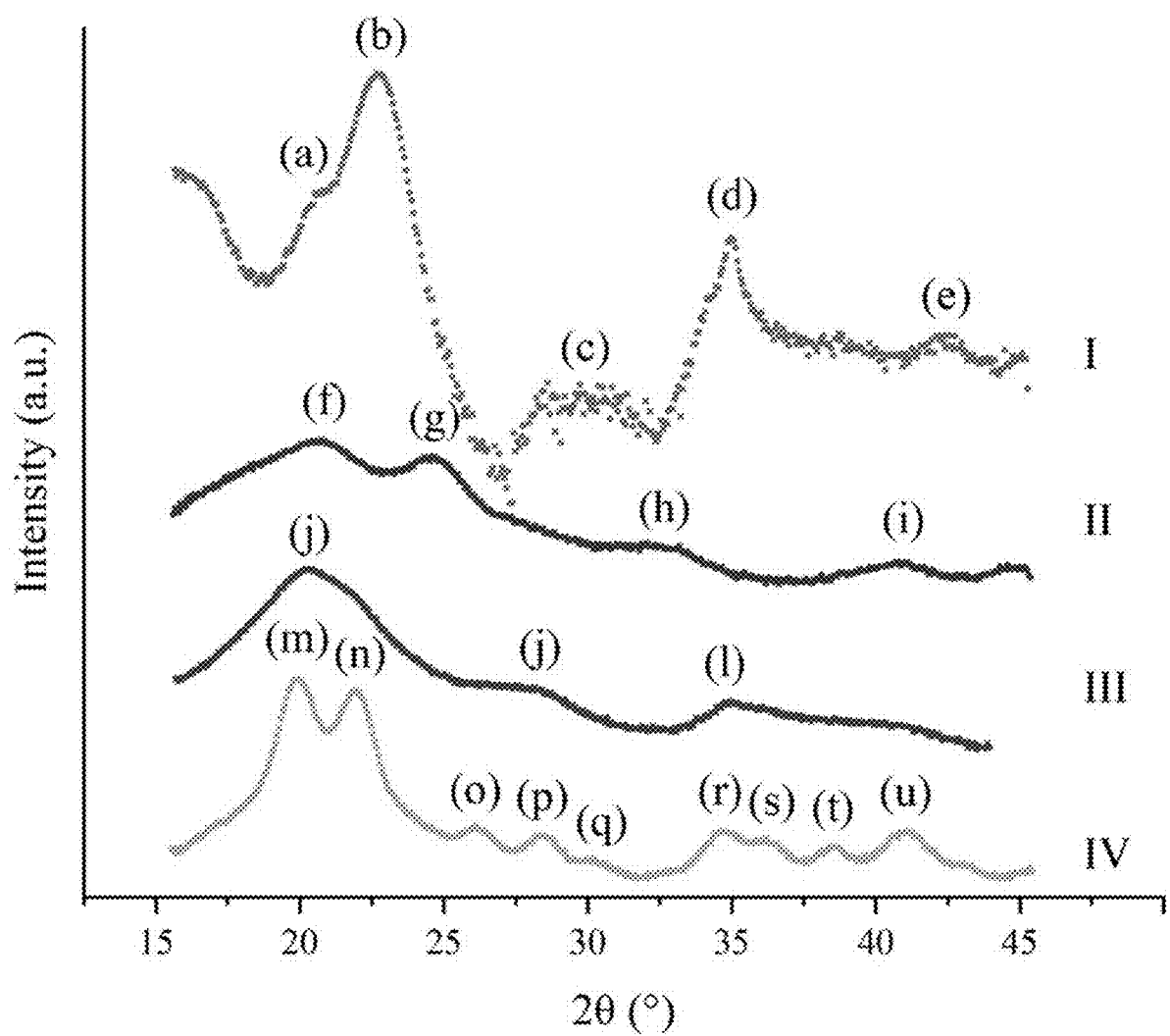
FIG. 6 shows wide angle scattering profiles of native and regenerated polymer samples: (I) Avicel microcrystalline cellulose, (II) *Bombyx mori* Silk, (III) regenerated 100% cellulose coagulated in water, (IV) regenerated 100% cellulose coagulated in 25% hydrogen peroxide.

These peaks contain the signature of both silk and cellulose materials. FIG. 6 shows that the morphology of pure Avicel cellulose can be transformed from a crystalline cellulose Iβ structure to an amorphous structure when regenerated in EMIMAc and coagulated with water. In addition, this film can be further changed from amorphous to a semi crystalline cellulose II structure by changing the coagulation agent from water to 25% hydrogen peroxide. These results demonstrated that the crystallinity of the cellulose can be influenced by the ionic liquid solvent and by the type of coagulation agent; using a solution of hydrogen peroxide changes the cellulose crystallinity of the product. Tables 3 and 4 shows the quantitative data for all biocomposites and for native samples, respectively. The data are presented both in scattering vector, q, and 2θ. In addition, the correlation distance, d, is shown and is as calculated by $d=2\pi/q$.

TABLE 3

X-ray scattering quantitative peaks from FIG. 5 (90% cellulose-10% silk biocomposites coagulated in various concentration of hydrogen peroxide).

| | 1% | | | 2% | | | 5% | | |
|---|---|---|---|---|---|---|---|---|---|
| Peak | q (nm$^{-1}$) | 2θ° | d (nm) | q (nm$^{-1}$) | 2θ° | d (nm) | q (nm$^{-1}$) | 2θ° | d (nm) |
| 1 | 14.34 | 20.24 | 0.44 | 14.39 | 20.31 | 0.44 | 14.27 | 20.14 | 0.44 |
| 2 | 15.34 | 21.67 | 0.41 | 15.52 | 21.93 | 0.4 | 15.62 | 22.08 | 0.4 |
| 3 | — | — | — | — | — | — | 18.73 | 26.54 | 0.34 |
| 4 | 20.2 | 28.67 | 0.31 | 20.02 | 28.4 | 0.31 | 20.21 | 28.68 | 0.31 |
| 5 | 0 | | | — | — | — | — | — | — |
| 6 | 24.72 | 35.26 | 0.25 | 24.83 | 35.43 | 0.25 | 24.69 | 35.23 | 0.25 |
| 7 | — | — | — | 25.84 | 36.92 | 0.24 | — | — | — |
| 8 | — | — | — | — | — | — | 26.99 | 38.63 | 0.23 |
| 9 | 28.6 | 41.03 | 0.22 | 29 | 41.63 | 0.22 | 28.86 | 41.43 | 0.22 |

| | 10% | | | 15% | | | 25% | | |
|---|---|---|---|---|---|---|---|---|---|
| Peak | q (nm$^{-1}$) | 2θ° | d (nm) | q (nm$^{-1}$) | 2θ° | d (nm) | q (nm$^{-1}$) | 2θ° | d (nm) |
| 1 | 14.25 | 20.11 | 0.44 | 14.23 | 20.09 | 0.44 | 14.18 | 20.01 | 0.44 |
| 2 | 15.52 | 21.93 | 0.4 | 15.52 | 21.93 | 0.4 | 15.64 | 22.1 | 0.4 |
| 3 | — | — | — | 18.54 | 26.26 | 0.34 | 18.66 | 26.44 | 0.34 |
| 4 | 20.24 | 28.73 | 0.31 | 20.07 | 28.48 | 0.31 | 20.16 | 28.61 | 0.31 |
| 5 | — | — | — | — | — | — | 21.44 | 30.47 | 0.29 |
| 6 | 24.69 | 35.23 | 0.25 | 24.63 | 35.13 | 0.26 | 24.5 | 34.95 | 0.26 |
| 7 | 25.63 | 36.62 | 0.25 | 25.55 | 36.49 | 0.25 | 25.57 | 36.52 | 0.25 |
| 8 | — | — | — | 26.99 | 38.63 | 0.23 | 27.03 | 38.69 | 0.23 |
| 9 | 28.6 | 41.03 | 0.22 | 28.73 | 41.23 | 0.22 | 28.81 | 41.35 | 0.22 |

TABLE 4

X-ray scattering quantitative peaks from FIG. 6 for native samples and 100% regenerated cellulose samples.

| Peak | q (nm$^{-1}$) | 2θ (°) | d (nm) |
|---|---|---|---|
| a | 14.50 | 20.47 | 0.43 |
| b | 16.07 | 22.71 | 0.39 |
| c | 20.95 | 29.76 | 0.30 |
| d | 24.50 | 34.95 | 0.26 |
| e | 29.33 | 42.14 | 0.21 |
| f | 14.60 | 20.61 | 0.43 |
| g | 17.36 | 24.56 | 0.36 |
| h | 22.63 | 32.21 | 0.28 |
| i | 28.40 | 40.74 | 0.22 |
| j | 14.35 | 20.26 | 0.44 |
| k | 19.79 | 28.07 | 0.32 |
| l | 24.46 | 34.88 | 0.26 |
| m | 14.11 | 19.91 | 0.45 |
| n | 15.52 | 21.93 | 0.40 |
| o | 18.45 | 26.13 | 0.34 |
| p | 20.00 | 28.38 | 0.31 |
| q | 21.25 | 30.19 | 0.30 |
| r | 24.28 | 34.63 | 0.26 |
| s | 25.34 | 36.19 | 0.25 |
| t | 26.91 | 38.51 | 0.23 |
| u | 28.60 | 41.03 | 0.22 |

TABLE 5

Crystal size results (τ) of biomaterial samples; labeled by coagulation concentration agent, obtained from the Scherrer equation.

| | peak 1 | | | peak 2 | | |
|---|---|---|---|---|---|---|
| Sample | 2q° | τ (nm) | SD | 2q° | τ (nm) | SD |
| 1 | 20.28 | 3.01 | 0.41 | — | — | — |
| 2 | 20.44 | 2.93 | 0.45 | — | — | — |
| 5 | 20.15 | 3.55 | 0.21 | 22.11 | 4.59 | 0.49 |
| 10 | 20.14 | 3.61 | 0.25 | 22.02 | 4.48 | 0.40 |
| 15 | 20.17 | 3.84 | 0.23 | 21.95 | 4.70 | 0.33 |
| 25 | 20.06 | 4.87 | 0.34 | 22.10 | 5.04 | 0.55 |

To understand the morphological changes in the present biocomposite films, one should first look at a native material. Four distinct contributions are observed in Avicel cellulose. The first two peaks in 2θ, a=20.47 and b=22.71 are related to the monoclinic unit cell of cellulose Iβ equatorial lattice planes. This corresponds to the 102 and 200 reflections, respectively. Upon dissolution in ionic liquid and coagulation in water, the cellulose Iβ morphology changed from crystalline to amorphous. The two reflections observed in Avicel cellulose Iβ turned into one reflection, 2θ=20.26. However, upon coagulating the Avicel cellulose with 25% hydrogen peroxide, the cellulose Iβ was modified to cellulose II. In this case, multiple reflections were observed for which the peak (m) and (n), FIG. 6, are related to the 110 and 200 reflections typical for this material; the other higher angle reflections are indicative of the crystalline structure periodicity. Analysis of the present results further confirm that a solution of hydrogen peroxide as a coagulation agent can induce morphological changes in the cellulose structure. In terms of the biocomposite films, reflections similar to that of the cellulose II were observed. In this case and based on the FTIR results, silk molecules are also present in the biocomposites, so the typical cellulose II reflections are slightly skewed.

The results show two main reflections at 2θ=20.01 and 22.10; the location of these two reflections barely changes as a function of hydrogen peroxide. However, their intensity linearly increases. The change in peak intensity is related to changes in crystallinity. To understand crystallization changes, the crystal size from the present biocomposite films were determined using the Scherrer equation using both the 110 and 200 reflections, $$\tau = \frac{K\lambda}{\beta \cos\theta}$$

where τ is the mean size of the crystal, K is the dimensionless shape factor (0.94), λ is the wavelength of the X-ray, β represents the FWHM in radians, and cos θ is the Bragg angle. Table shows the Scherrer equation crystal size results. The crystal size (τ) associated with the scattering angle of 2θ in the biomaterial data shows a positive correlation with higher concentrations of hydrogen peroxide as the coagulation agent. The reflection at 110 shows a better relationship than at 200 probably due to the interference from the silk. The crystal size for the 110 reflection increases from 3.01 nm to 4.87 nm and for the 200 reflection from 4.59 nm to 5.04 nm.

Figure 7A:
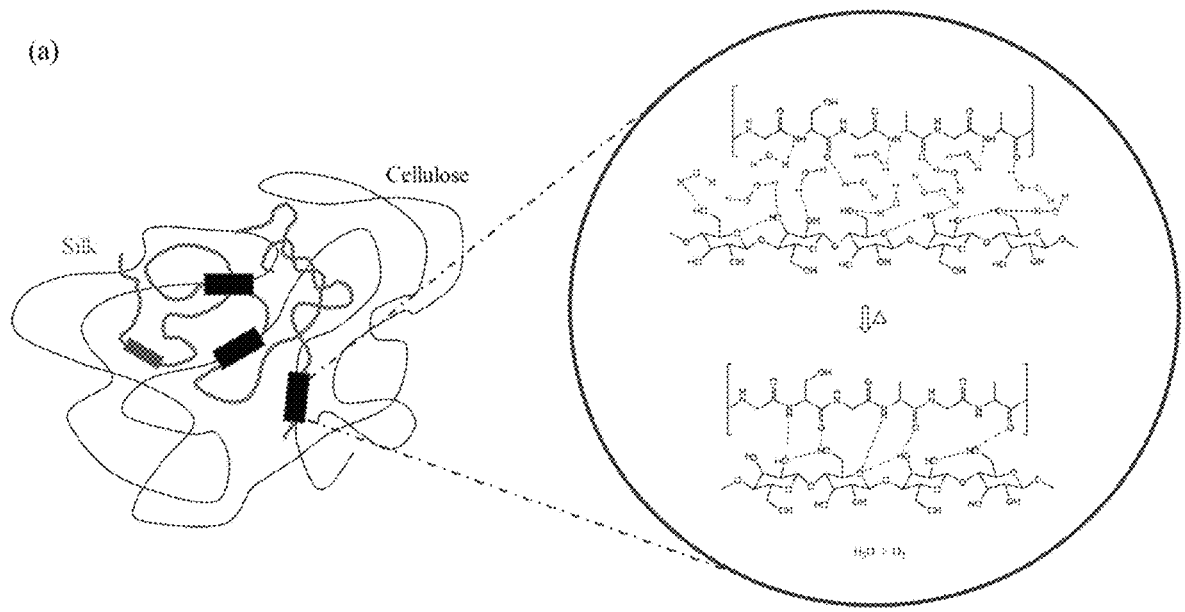
FIGS. 7A-7B shows a regeneration mechanism for biocomposite coagulated in (FIG. 7A) 1% hydrogen peroxide and (FIG. 7B) 25% hydrogen peroxide. A higher concentration of coagulating agent prefers to hydrogen bond with the cellulose hydroxide group which aligns the molecules into crystalline structures.
Figure 7B:
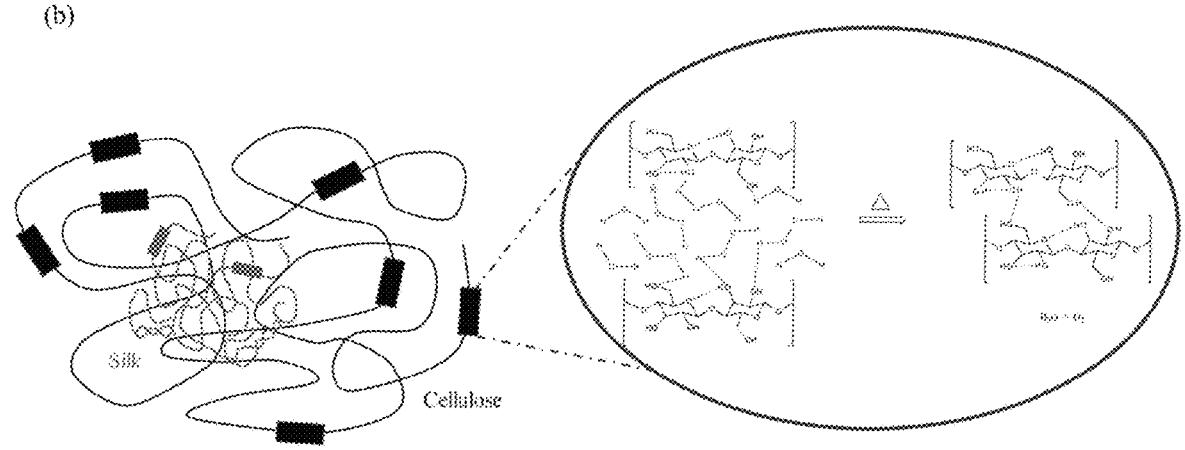

In comparison, the Avicel cellulose Iβ crystal size calculated from the Scherrer equation using the reflection at 200 is 4.25 nm and for the 100% regenerated cellulose coagulated with 25% hydrogen peroxide is 5.12 nm. The results of the present biomaterials are within the native samples ranges indicating that both the silk and cellulose are interacting at the nano-level, as expected. Based on these results it may be concluded that the cellulose crystal size increases as a function of hydrogen peroxide content. FIGS. 7A-7B show a coagulation mechanism of hydrogen peroxide after the removal of ionic liquid. However, before this salting-out effect, hydrogen peroxide and water molecules coexist within the system containing the dissolved silk fibroin, cellulose, and ionic liquid. These water and hydrogen peroxide molecules quickly hydrate the protein and cellulose chains. This leads to the formation of stable structures resulting from the formation of protein secondary structures and interactions with cellulose; these interactions involve hydrogen bonds, electrostatic interactions, and covalent bonds.

The interaction between silk, cellulose, and the solvent may promote and stabilize its morphological structure to lower conformation energies, resulting from the hydrogen bonds with water and hydrogen peroxide. As hydrogen peroxide content increases, the hydrogen peroxide molecules prefer to hydrogen bond with the cellulose rather than the silk, resulting in a metastable polymer blend form due to a lack of ions, further promoting solvation. Upon drying, hydrogen peroxide is converted into oxygen gas and water molecules. This chemical reaction collapses the polymer chains in situ, resulting in changes in the cellulose crystallinity; specially the cellulose crystal size. As a result, the morphology and physicochemical properties of the material will depend on the solvent composition and volume spacing between polymer chains. In other words, any perturbation in the metastable system will cause changes in the material formation, dictating final properties. Moreover, the cellulose can act as a nucleating agent to increase the nucleation and overall crystallization rate leading to an increase in crystallites.

X-ray Small-angle Scattering (SAXS) and Wide-angle Scattering (WAXS) were performed for the morphological comparison of native wool keratin and microcrystalline Avicel cellulose to regenerated wool keratin-cellulose blended biomaterials (FIGS. 14A-14B). FIG. 14A shows biomaterials composed of 25% wool keratin and 75% cellulose, all of which were fabricated using the solvent, EMIMAc, and coagulation agents, ethanol or hydrogen peroxide solutions (both at 1 and 25 wt. % in $H_2O$). The reflection regions shown in the regenerated samples labeled as $A_n$, $D_n$, and $F_n$ are characteristic of the reflection regions labeled on the native materials' profiles, $A_{\alpha,\beta}$, $D_{\alpha,\beta}$, and $F_{\alpha,\beta}$. Furthermore, when compared to these pure materials, the aforementioned reflections in the regenerated sample profiles are not only shifted along the scattering vector (q) but also show varying degrees of peak broadness and/or sharpness in intensity. These shape variations of peaks and shifts along the scattering vector are most likely due to changes in the intermolecular exchanges within the materials' matrix, e.g., wool keratin secondary structures interacting with cellulose crystallites. Similar results are shown in FIG. 14B (75% wool keratin to 25% cellulose) and all q and d values for WAXS and SAXS are shown in FIG. 15.

In FIG. 14A, the 25% wool keratin samples, peaks "D" and "F" are characteristic of reflections generated by cellulose within the fabricated samples and not those of the wool keratin. When comparing the regenerated samples consisting 75% wool keratin to pure wool keratin, FIG. 14B, the peak denoted as Da shifted to an increased q value in all regenerated biomaterial samples. However, this same peak located in the 75% wool keratin sample when coagulated in 25% hydrogen peroxide, $D_4$, is muted due to the broad reflection representative of the pronounced peak denoted as $D_\beta$ from the pure cellulose; this reflection shifts from 10.55 $nm^{-1}$ to 8.64 $nm^{-1}$. In both samples regenerated in 25% hydrogen peroxide, a noticeable difference in the WAXS region can be seen when compared to all other regenerated biomaterials. These distinctive reflections indicate an overall increase in cellulose crystal sizes due to an increased amount of hydrogen peroxide molecules. Without being bound by theory, hydrogen peroxide molecules have the ability to hydrogen bond with cellulose hydroxide groups, thus aligning the molecules in solution and later enhancing more crystalline cellulose structures. This process may be due to the hydrogen peroxide converting to oxygen gas and water molecules in situ, which collapses the polymer chains and results in changes of polysaccharide crystallinity. In FIG. 15, the peak denoted as "$G_4$" incorporates a bimodal peak as seen in the figures for both samples coagulated in 25% hydrogen peroxide.

In regard to the peaks denoted as $F_n$, a similar reflection shift may be seen regardless of polymer ratio content in all samples. This may be due to a combined effect from both cellulose and wool keratin at this region. Such peaks are more pronounced in the 25% wool keratin samples compared to the reversed polymer ratio content, mostly likely due to the distribution of sharper and larger peaks in that general area located in the native cellulose. However, these reflections when comparing the shift in peak $F_n$ in the 75% wool keratin samples, contain a shifted q value of 14.18 to 12.29 $nm^{-1}$. This was apparent for samples synthesized from lower concentrations of the coagulation agents. This same shift also resulted to a slightly higher value of 14.36 $nm^{-1}$ for 75% wool keratin samples made from higher concentrations of coagulation solutions. Peak $F_\beta$ is highly pronounced in native cellulose and appears in all samples regardless of polymer content ratio. The periodicity located in the SAXS data for pure wool keratin seems to have been lost in all regenerated biomaterial samples. Whereas another reflection, most likely representative of the nanophase separation between polymers, appears in the 1% ethanol and the 25% hydrogen peroxide coagulated 75% wool keratin sample profiles. This reflection may also be seen in the 25% wool keratin materials with the exception of the sample coagulated in 25% hydrogen peroxide.

The Bragg equation, $n\lambda=2d\sin\theta$, was used to calculate the crystalline interplanar spacing (d-spacing) for all materials within this study and all values are located in FIG. 15. Due to the linear relationship of this equation, the distance between atoms ($nm^{-1}$) in a crystalline lattice decreases as q decreases, and reflections A, D, F, and G are analyzed quantitatively in this work. Within the SAXS data, peak $A_n$ for all samples shows d values similar to the pure Avicel cellulose peak at $A_\beta$. We theorize that cellulose influences the manipulation of a blend's crystalline nature at the nano-scale, even when wool keratin dominates as the polymer in the blend.

However, upon investigating WAXS data at the $D_n$ site, which provides information on the sub-nanometer-sized structures, d values are relative to the polymer that dominates in the respective regenerated sample. In other words, the d-spacing values calculated within this $D_n$ region for the 75% wool keratin more closely matches d at the peak labeled as $D_\alpha$ (pure wool keratin). Still, one exception is that of the 75% wool keratin sample regenerated in 25% hydrogen peroxide. Here, the d value calculated at peak $D_4$ resembles that of $D_\beta$ which is associated with pure cellulose and not the corresponding reflection in the wool keratin profile. In fact, larger d-spacings are calculated when either cellulose dominates in the regenerated blend or higher concentrations of hydrogen peroxide solution is used during sample fabrication.

This makes sense since compared to keratin, cellulose would be the major contributor to crystalline nanostructures within the samples, as seen in the SAXS data, and a higher concentration of hydrogen peroxide solution facilitates larger crystal sizes within regenerated cellulose. This is validated with the largest d value of 0.72 $nm^{-1}$, at peak $D_4$, calculated when compared against all regenerated sample d values at this particular reflection site. Here, we not only have cellulose as the dominate polymer in the blend, but also the highest concentration of hydrogen peroxide solution used during sample coagulation. Likewise, d at $F_n$ in all samples resemble values to those calculated from $F_\beta$, Avicel cellulose; a broader halo may be observed at the reflection of this particular plane, especially in the 75% wool keratin samples, indicating more amorphous structures when compared to other sample blends.

Furthermore, bimodality (peak $G_4$) in the regenerated sample profiles present d values calculated between 0.40-0.45 $nm^{-1}$ and is only seen for samples regenerated in 25% hydrogen peroxide. Thus, showing considerably larger spacing distances between lattice chains at this plane. Therefore, when considering the data presented here in regard to crystalline nanostructures and their interplanar spacings, cellulose phase interactions and coagulation agent will be the determining factors for morphological manipulation upon fabrication. Additionally, FIG. 16 shows a possible schematic representation of the effect of hydrogen peroxide in the fabrication process. In this figure, the first row shows the initial phase of biomaterial dissolution, and the second row shows the final phase after coagulation. This figure is modeled after a study from Vu, T., et al. These results demonstrate that the morphology of a blended wool keratin to cellulose regenerated biomaterial is influenced by both the polymer ratio content and coagulation agent used in its fabrication. Various reflections representative of native wool keratin and cellulose appear in the regenerated samples containing both polymers, and specific regions for these reflections have been denoted within this study to further the study of nano-structure morphology of biopolymer blends.

The terms and expressions employed herein are used as terms of description and not of limitation, and there is no intention in the use of such terms and expressions of excluding any equivalents of the features shown and described or portions thereof, but it is recognized that various modifications are possible within the scope of the embodiments of the present application. Thus, it should be understood that although the present application describes specific embodiments and optional features, modification and variation of the compositions, methods, and concepts herein disclosed may be resorted to by those of ordinary skill in the art, and that such modifications and variations are considered to be within the scope of embodiments of the present application.

ENUMERATED EMBODIMENTS

The following exemplary embodiments are provided, the numbering of which is not to be construed as designating levels of importance:

Embodiment 1 provides a method of increasing cellulose crystal size, the method comprising: providing a mixture of at least one solvent comprising at least one ionic compound and a first composition comprising cellulose; and coagulating the mixture with a second composition comprising hydrogen peroxide, thereby increasing cellulose crystal size.

Embodiment 2 provides the method of embodiment 1, wherein the first composition is about 1% to about 99% w/w of the mixture.

Embodiment 3 provides the method of any one of embodiments 1-2, wherein the cellulose is about 1% to about 100% w/w of the first composition.

Embodiment 4 provides the method of any one of embodiments 1-3, wherein the cellulose comprises at least one of microcrystalline cellulose, amorphous cellulose, cellulose fibers, films, gels, foams, or cellulose derivatives.

Embodiment 5 provides the method of any one of embodiments 1-4, wherein the composition further comprises at least one of silk, keratin, collagen, elastin, chitin, chitosan, hyaluronic acid, polylactic acid, polycaprolactone, poly(methyl methacrylate), graphene, carbon nanotubes, reduced graphene oxide, or combinations thereof.

Embodiment 6 provides the method of any one of embodiments 1-5, wherein the cationic portion of the ionic compound is at least one of an imidazolium-derivative, ammonium-derivative, morpholinium-derivative, amidinium-derivative, guanidinium-derivative, alkali earth metal cation, or combinations thereof.

Embodiment 7 provides the method of any one of embodiments 1-6, wherein the anionic portion of the ionic compound is at least one of $F^-$, $Cl^-$, $Br^-$, $I^-$, $R''(C=O)O^-$, $CN^-$, $PF_6^-$, $BF_4^-$, $CF_3SO_3^-(CF_3SO_3)_2N^-$, $R''OSO_3^-$, and $AlCl_4^-$, wherein R'' is a $C_{1-12}$ hydrocarbyl.

Embodiment 8 provides the method of any one of embodiments 1-7, wherein the ionic compound comprises 1-ethyl-3-methylimidazolium acetate or 1-ethyl-3-methylimidazolium chloride.

Embodiment 9 provides the method of any one of embodiments 1-8, wherein the coagulating step comprises contacting the mixture with the second composition.

Embodiment 10 provides the method of any one of embodiments 1-9, wherein the second composition comprises water.

Embodiment 11 provides the method of any one of embodiments 1-10, wherein the hydrogen peroxide is about 1% to about 30% v/v of the second composition.

Embodiment 12 provides the method of any one of embodiments 1-11, wherein the contacting is for a period of about 1 to about 60 hours.

Embodiment 13 provides the method of any one of embodiments 1-12, wherein the contacting is for a period of about 48 hours.

Embodiment 14 provides the method of any one of embodiments 1-13, wherein the cellulose crystal size increases by about 10% to about 80% as determined by X-ray crystallography.

Embodiment 15 provides the method of any one of embodiments 1-14, wherein the cellulose crystal size increases about 50% to about 70%.

Embodiment 16 provides the method of any one of embodiments 1-15, wherein the cellulose in the first composition is at least about 90% w/w cellulose I, and the coagulating converts the cellulose I into at least 90% w/w cellulose II.

Embodiment 17 provides a cellulose-containing material produced by the method of any one of embodiments 1-16.

Embodiment 18, provides the cellulose-containing material of embodiment 17, wherein the cellulose-containing material comprises an electrolyte membrane, antibacterial membrane, membrane scaffold for tissue growth, or a separation//filtration membranes for heavy metal filtration from water and sewage systems.

What is claimed is:

1. A method of increasing cellulose crystal size, the method comprising:
   providing a mixture of at least one solvent comprising at least one ionic compound and a first composition comprising cellulose; and
   contacting the mixture with a second composition comprising hydrogen peroxide, wherein the contacting results in coagulation of the mixture, thereby increasing cellulose crystal size in the coagulated mixture.

2. The method of claim 1, wherein the first composition is about 1% to about 99% w/w of the mixture.

3. The method of claim 2, wherein the cellulose is about 1% to about 100% w/w of the first composition.

4. The method of claim 1, wherein the cellulose comprises at least one of microcrystalline cellulose, amorphous cellulose, cellulose fibers, films, gels, foams, and cellulose derivatives.

5. The method of claim 1, wherein the first composition further comprises at least one of silk, keratin, collagen, elastin, chitin, chitosan, hyaluronic acid, polylactic acid, polycaprolactone, poly(methyl methacrylate), graphene, carbon nanotubes, reduced graphene oxide, or combinations thereof.

6. The method of claim 1, wherein the cationic portion of the at least one ionic compound is at least one of an imidazolium-derivative, ammonium-derivative, morpholinium-derivative, amidinium-derivative, guanidinium-derivative, alkali earth metal cation, or combinations thereof.

7. The method of claim 1, wherein the anionic portion of the at least one ionic compound is at least one of $F^-$, $Cl^-$, $Br^-$, $I^-$, $R''(C=O)O^-$, $CN^-$, $PF_6^-$, $BF_4^-$, $CF_3SO_3^-$, $(CF_3SO_3)_2N^-$, $R''OSO_3^-$, and $AlCl_4^-$, wherein $R''$ is a $C_{1-12}$ hydrocarbyl.

8. The method of claim 1, wherein the ionic compound comprises 1-ethyl-3-methylimidazolium acetate or 1-ethyl-3-methylimidazolium chloride.

9. The method of claim 1, wherein the second composition comprises water.

10. The method of claim 9, wherein the hydrogen peroxide is about 1% to about 30% v/v of the second composition.

11. The method of claim 1, wherein the contacting is for a period of about 1 to about 60 hours.

12. The method of claim 11, wherein the contacting is for a period of about 48 hours.

13. The method of claim 1, wherein the cellulose crystal size increases by about 10% to about 80% as determined by X-ray crystallography.

14. The method of claim 13, wherein the cellulose crystal size increases by about 50% to about 70%.

15. The method of claim 1, wherein the cellulose in the first composition is at least about 90% w/w cellulose I, and wherein the coagulating converts the cellulose I into at least 90% w/w cellulose II.

* * * * *